(12) United States Patent
Vlachos et al.

(10) Patent No.: US 7,882,126 B2
(45) Date of Patent: Feb. 1, 2011

(54) SYSTEMS AND METHODS FOR COMPUTATION OF OPTIMAL DISTANCE BOUNDS ON COMPRESSED TIME-SERIES DATA

(75) Inventors: Michail Vlachos, Tarrytown, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 12/027,294

(22) Filed: Feb. 7, 2008

(65) Prior Publication Data

US 2009/0204574 A1 Aug. 13, 2009

(51) Int. Cl.
*G06F 17/30* (2006.01)
(52) U.S. Cl. .................................................... 707/769
(58) Field of Classification Search ............... 707/693, 707/705, 713, 769, 999.004, 999.101, E17.14
See application file for complete search history.

(56) References Cited

PUBLICATIONS

Saanghyun Park, Fast Retrieval of Similar Subsequences in Long Sequence Databases, Aug. 1999, UCLA-CS-TR-990028.*
Adar et al., "Why we Search: Visualizing and Predicting User Behavior", in Proc. of World Wide Web, pp. 161-170, May 2007.
Agrawal et al., "Efficient Similarity Search in Sequence Databases", in Proc. of Foundations of Data Organizations (FODO), 15 pages, 1993.
Chen et al., "Improving Query Spelling Correction Using Web Search Results", Proc. of the 2007 Joint Conference on Empirical Methods in Natural Language Processing and Computational Natural Language, pp. 181-189, Jun. 2007.
Chien et al., "Semantic Similarity Between Search Engine Queries Using Temporal Correlation", in Proc. of World Wide Web, pp. 2-11, May 2005.
Lie et al., "Measuring the Meaning in Time Series Clustering of Text Search Queries", in Proc. of CIKM, pp. 836-837, Nov. 2005.
Rafiei et al., "Efficient Retrieval of Similar Time Sequences Using dft", in Proc. of Foundations of Data Organizations (FODO), 9 pages, Nov. 1998.
Vlachos et al., "Identifying Similarities, Periodicities & Bursts for Online Search Queries", in Proc. of SIGMOD, 12 pages, Jun. 2004.

(Continued)

*Primary Examiner*—John E Breene
*Assistant Examiner*—Thu-Nguyet Le
(74) *Attorney, Agent, or Firm*—Tutunjian & Bitetto, PC; William J. Stock, Esq.

(57) ABSTRACT

There are provided a method and a system for computation of optimal distance bounds on compressed time-series data. In a method for similarity search, the method includes the step of transforming sequence data into a compressed sequence represented by top-k coefficients of the sequence data and a sum of the energy of omitted coefficients of the sequence data. The method further includes the step of computing at least one of a lower bound and an upper bound on a distance range between a query sequence and the compressed sequence, given a first and a second constraint. The first constraint is that a sum of squares of the omitted coefficients is less than a sum of the energy of the omitted coefficients. The second constraint is that the energy of the omitted coefficients is less than the energy of a lowest energy one of the top-k coefficients.

18 Claims, 18 Drawing Sheets

OTHER PUBLICATIONS

Vlachos et al., "On Periodicity Detection and Structural Periodic Similarity", in Proc. of SDM, pp. 3-12, 2005.

Wang et al., "Multilevel Filtering for High Dimensional Nearest Neighbor Search", in ACM SIGMOD Workshop on Research Issues in Data Mining and Knowledge Discovery, pp. 1-7, 2000.

* cited by examiner

PAA
e=48.3, coeffs=10

APCA
e=46, coeffs=5

Chebyshev
e=47.7, coeffs=10

Fourier (first coeffs)
e=47.4, coeffs=5

Fourier (best coeffs)
e=29.3, coeffs=5

```
1  // Q is uncompressed
2  // X is compressed + eX is the error of discarded coefficients
3  //
4  function [LB, UB] =optimal (Q, [X, eX])
5  {
6     p+ = find(X.coeffs); // best coefficients of X
7     minPower = min(abs(X(p+)));
8
9     //distance of known coefficients
10    distSq = sum( abs( X(p+) - Q(p+) ). ^2);
11
12    // distance from the remaining coeffcients
13    p- = setdiff([1:N] , p+); // discarded coefficients
14
15    eY = sum(abs([Q(p-)]. ^2); // eX is given
16
17    directions = Q ./ norm(Q); // extract direction
18    Xnew = directions .* norm(X); // rescale it
19
20    violations = find(Xnew > minPower);
21
22    // iterate until no energy is left
23    while (-isempty(violations))
24    {
25       Xnew(violations) = minPower; // fix these dimensions
26
27       remainingCoeff = find(Xnew < minPower);
28       delta = sqrt(( eX - |Xnew| -|remainingCoeff|)*(minPower^2) ) /sum(directions(dest).^2));
29       Xnew(remainingCoeff) = delta * directions(remainingCoeff);
30
31       violations = find(Xnew > minPower);
32    }
33
34    LB = distSq + sum((Q - Xnew).^2); // updated lower bound
35    UB = distSq + sum((Q + Xnew).^2); // updated upper bound
36
37    LB = sqrt(LB);
38    UB = sqrt(UB);
39 }
```

FIG. 10

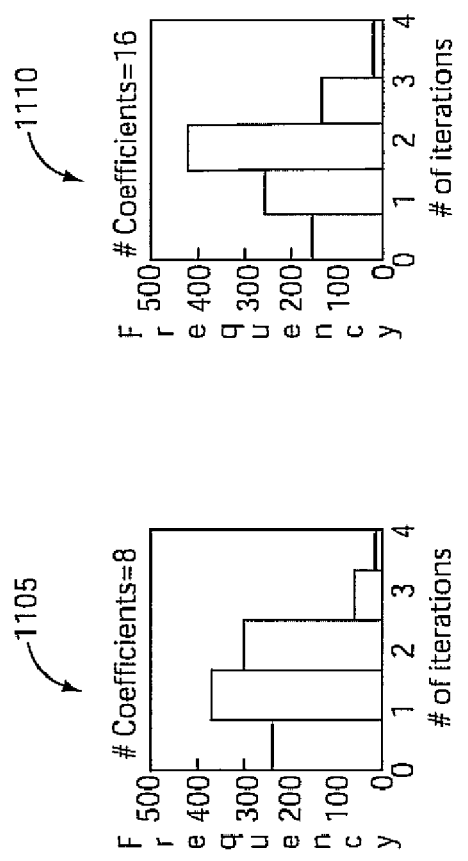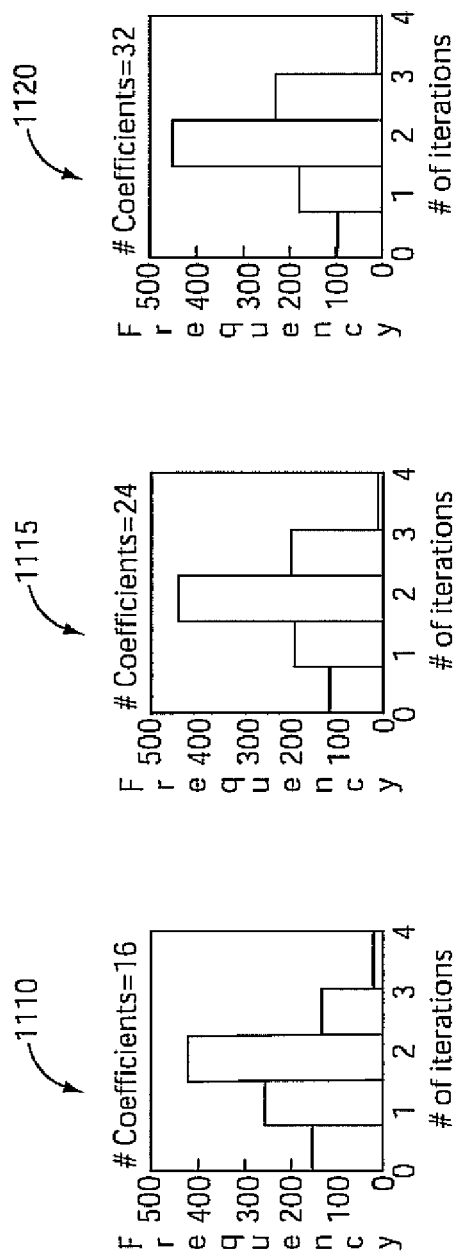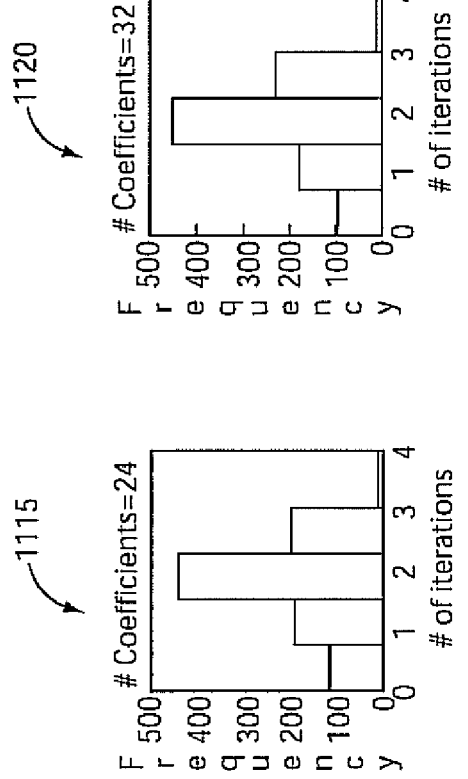
FIG. 11A
FIG. 11B
FIG. 11C
FIG. 11D

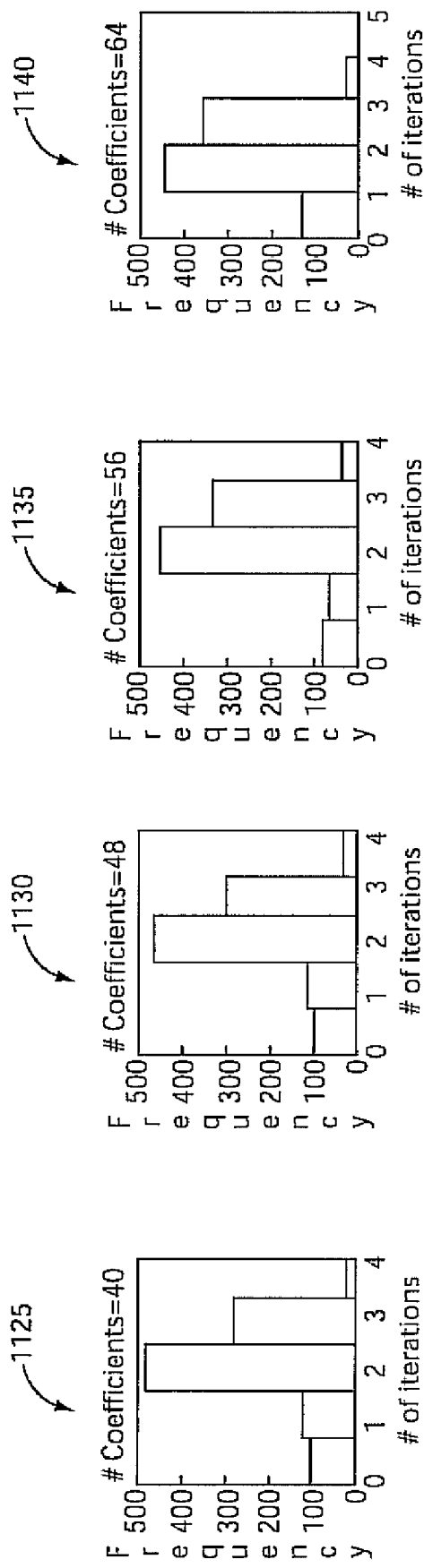

SYSTEMS AND METHODS FOR COMPUTATION OF OPTIMAL DISTANCE BOUNDS ON COMPRESSED TIME-SERIES DATA

BACKGROUND

1. Technical Field

The present invention relates generally to compressed time-series representations and, more particularly, to systems and methods for computation of optimal distance bounds on compressed time-series data.

2. Description of the Related Art

In the data-mining community, searching on time-series data under the Euclidean metric has been studied extensively, as described by Agrawal et al., "Efficient Similarity Search in Sequence Databases", in Proc. of Foundations of Data Organizations (FODO), 15 pages, 1993, Rafiei et al., "Efficient Retrieval of Similar Time Sequences Using dft", in Proc. of Foundations of Data Organizations (FODO), 9 pages, November 1998, and Wang et al., "Multilevel Filtering for High Dimensional Nearest Neighbor Search", in ACM SIGMOD Workshop on Research Issues in Data Mining and Knowledge Discovery, pp. 1-7, 2000, the disclosures of which are incorporated by reference herein. However, such studies have typically considered compression using only the first Fourier or wavelets. The use of diverse sets of coefficients has been studied as described by Vlachos et al., "Identifying Similarities, Periodicities & Bursts for Online Search Queries", in Proc. of SIGMOD, 12 pages, June 2004, the disclosure of which is incorporated by reference herein.

However, no prior art exists directed to the tightest possible lower/upper bounds.

SUMMARY

These and other drawbacks and disadvantages of the prior art are addressed by the present principles, which are directed to systems and methods for computation of optimal distance bounds on compressed time-series data.

According to an aspect of the present principles, there is provided a method for similarity search. The method includes transforming sequence data into a compressed sequence represented by top-k coefficients of the sequence data and a sum of the energy of omitted coefficients of the sequence data. The method further includes computing at least one of a lower bound and an upper bound on a distance range between a query sequence and the compressed sequence, given a first and a second constraint. The first constraint is that a sum of squares of the omitted coefficients is less than a sum of the energy of the omitted coefficients. The second constraint is that the energy of the omitted coefficients is less than the energy of a lowest energy one of the top-k coefficients.

According to another aspect of the present principles, there is provided a computer readable medium including a computer readable program for similarity search. The computer readable program when executed on a computer causes the computer to perform the step of transforming sequence data into a compressed sequence represented by top-k coefficients of the sequence data and a sum of the energy of omitted coefficients of the sequence data. The computer readable program when executed on a computer causes the computer to perform the step of computing at least one of a lower bound and an upper bound on a distance range between a query sequence and the compressed sequence, given a first and a second constraint. The first constraint is that a sum of squares of the omitted coefficients is less than a sum of the energy of the omitted coefficients. The second constraint is that the energy of the omitted coefficients is less than the energy of a lowest energy one of the top-k coefficients.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 10 is a diagram illustrating exemplary pseudocode for a solution to an optimization problem, in accordance with an embodiment of the present principles;

FIGS. 11A-H are histograms of the number of iterations for convergence on the optimization algorithm represented by FIGS. 9A-F, in accordance with an embodiment of the present principles;

DETAILED DESCRIPTION OF PREFERRED EMBODIMENTS

Figure 1:
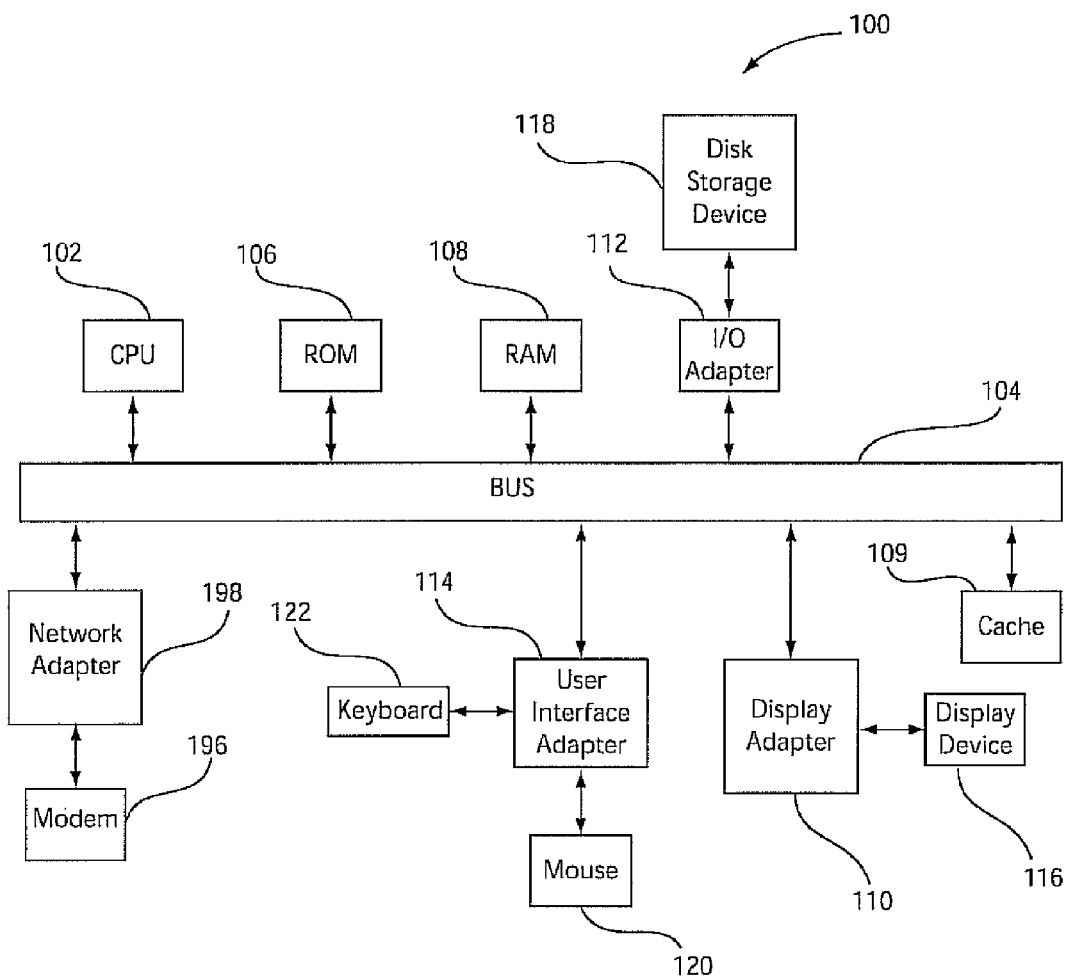
FIG. 1 is a block diagram illustrating an exemplary computing device to which the present principles may be applied, according to an embodiment thereof.

Embodiments of the present principles are directed to systems and methods for computation of optimal distance bounds on compressed time-series data. Thus, any reference herein to lower bounds and upper bounds with respect to the inventive aspects of the present principles refer to optimal lower bounds and optimal upper bounds. Hence, when computing a lower bound and/or an upper bound on a distance range between a query sequence and a compressed sequence, given a first and second constraint, any of the lower bound and the upper bound is optimal by being substantially identical (as close as possible) to an actual distance between the query sequence and the compressed sequence, subject to an amount of compression of the compressed sequence (and also subject to an amount of compression of the query sequence when the query sequence is compressed).

It should be understood that the elements shown in the FIGURES may be implemented in various forms of hardware, software or combinations thereof. Preferably, these elements are implemented in software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Time-series databases (e.g., medical, environmental, industrial measurements, etc.) are growing in size, and therefore manipulation of the sequences in a compressed form is needed for fast data processing and compact storage requirements. Here, we explicate how to compute the optimal lower and upper distance bounds on the time-series logs when working directly on their compressed form.

Systems and methods are provided for computing the tightest possible distance bounds (upper and lower bounds), when working on compressed time-series data. The data can be compressed using any orthonormal decomposition. In an embodiment, the compression involves retaining the best coefficients) (e.g., the coefficient(s) having the highest energy (e.g., above a given threshold) or using a threshold number of coefficients having the highest energy), plus the reconstruction error attributed to the omitted coefficients.

FIG. 1 is a block diagram for an exemplary computing device 100 to which the present principles may be applied, in accordance with an embodiment of the present principles.

The computing device 100 includes at least one processor (CPU) 102 operatively coupled to other components via a system bus 104. A read only memory (ROM) 106, a random access memory (RAM) 108, a display adapter 110, an I/O adapter 112, a user interface adapter 114, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keyboard 122 are operatively coupled to system bus 104 by user interface adapter 114. The mouse 120 and keyboard 122 are used to input and output information to and from system 100.

A (digital and/or analog) modem 196 is operatively coupled to system bus 104 by network adapter 198.

Figure 2:
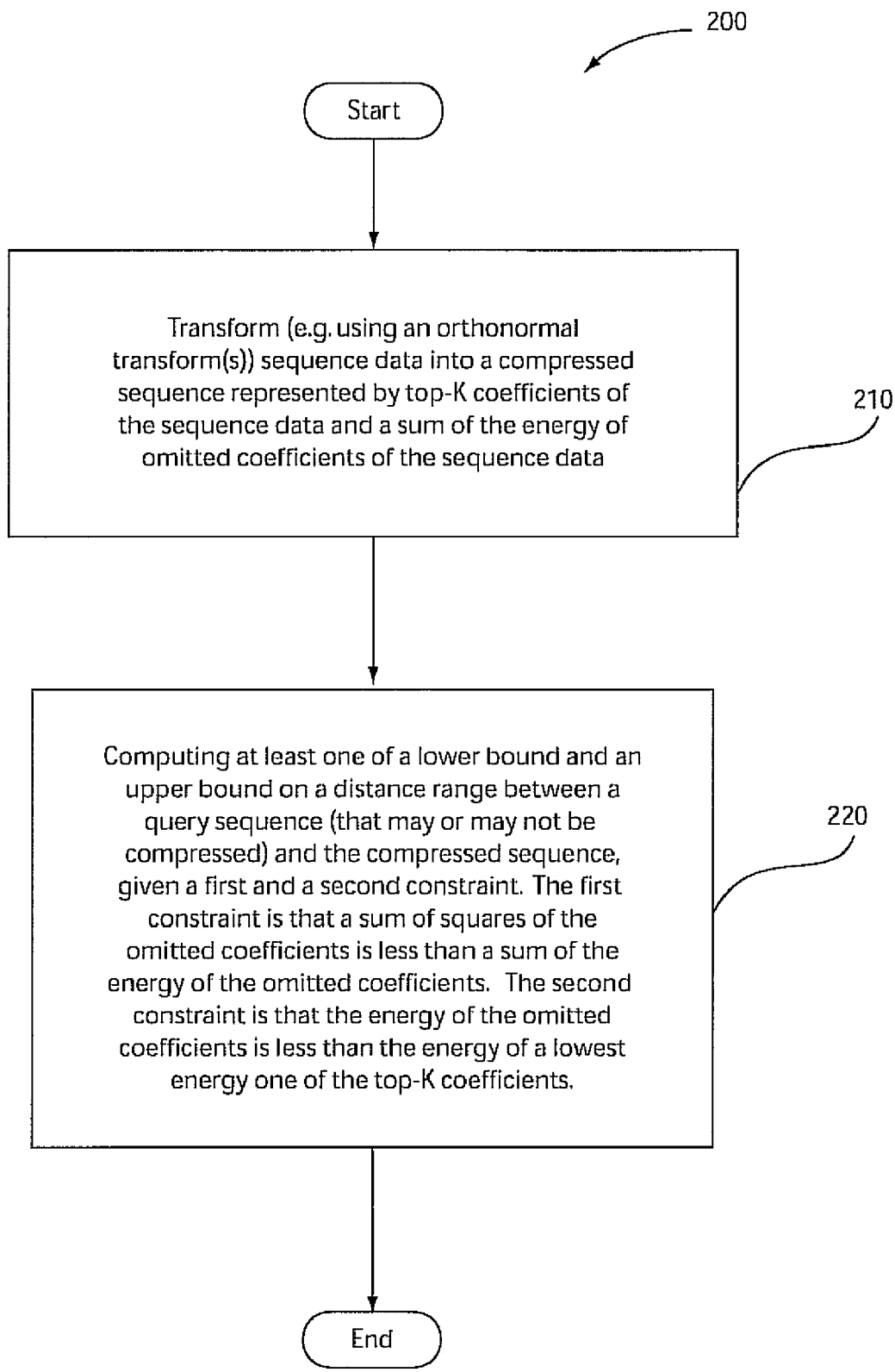
FIG. 2 is a flow diagram illustrating an exemplary method for computation of optimal distance bounds on compressed time-series data, in accordance with an embodiment of the present principles.

FIG. 2 is a flow diagram for an exemplary method 200 for computation of optimal distance bounds on compressed time-series data, in accordance with an embodiment of the present principles. In the example of FIG. 2, the method is implemented as a similarity search between a query sequence and a compressed (or non-compressed) sequence in a time-series database that includes a plurality of sequences, where each sequence includes sequence data. The query sequence may or may not be compressed, depending upon the implementation.

The method 200 includes transforming (e.g., using an orthonormal transform(s)) sequence data into a compressed sequence represented by top-k coefficients of the sequence data and a sum of the energy of omitted coefficients of the sequence data (step 210).

The method 200 further includes computing at least one of a lower bound and an upper bound on a distance range between a query sequence (that may or may not be compressed) and the compressed sequence, given a first and a second constraint (step 220). The first constraint is that a sum of squares of the omitted coefficients is less than a sum of the energy of the omitted coefficients. The second constraint is that the energy of the omitted coefficients is less than the energy of a lowest energy one of the top-k coefficients.

It is to be appreciated that the lower bound and/or the upper bound is substantially identical (i.e., as close as possible, also referred to herein as "optimal") to an actual distance between the query sequence and the compressed sequence subject to an amount of compression of the compressed sequence, when the query sequence is not compressed.

Moreover, it is to be appreciated that in the case that the query sequence is also compressed, then the lower bound and/or the upper bound is substantially identical (i.e., as close as possible, also referred to herein as "optimal") to an actual distance between the query sequence and the compressed sequence subject to an amount of compression of the compressed sequence and the query sequence.

While the computing step 220 may use a linear distance function, such as, but not limited to Euclidean distance, the present principles are not limited to any particular distance metric and, thus, other distance metrics may be used while maintaining the spirit of the present principles.

Further, the computing step 220 may use a non-linear distance function that is capable of being bounded by a linear distance including, but not limited to, Time-Warping, Longest Common Subsequence, and so forth, while maintaining the spirit of the present principles.

As noted above, the transforming step 210 may involve and/or otherwise use an orthonormal transform. The orthonormal transform may involve, for example, at least one of Fourier components, wavelet components, and principal components of the sequence data.

As noted above, the present principles are directed to computing the tightest possible distance estimations (upper and lower bounds) when operating on compressed time-series data. In an embodiment, given a database of time-series data and a query, we execute very fast nearest-neighbor (NN) search operations on compressed data. The present principles have wide applicability as many database, data-mining and machine learning operations have a NN-search component at their core.

As databases of time-series grow larger, there is an explicit need not only for storing the data in a compressed form, but also performing operations directly on the compressed data. We provide efficient mechanisms, for both compression and NN-search operation. For compression, in an embodiment, we utilize the best coefficients (highest energy, e.g., above a given threshold or threshold number of coefficients having the highest energy) of an orthonormal transform. Throughout the description we utilize the Fourier decomposition, but it is to be appreciated that the present principles are applicable to any orthonormal transform. Additionally, to compensate for the omitted coefficients, we hold their total energy, which describes the introduced error. Given the above time-series compression, we can estimate the tightest possible upper and lower bounds on the distance, between the query and any compressed (or uncompressed) sequence. Our formulation allows for any linear distance to be optimally bounded. To ease exposition of ideas we focus just on Euclidean distance. However, it is to be appreciated that the present principles are not limited to Euclidean distance and may be applied with respect to any distance metric, while maintaining the spirit of the present principles. Also, we note that the query can be also compressed or uncompressed. Therefore, we can provide optimal distance between an uncompressed time-series and a compressed one, or between two compressed time-series, while maintaining the spirit of the present principles.

Test Case: Search on Compressed Weblog Data

Figure 3:
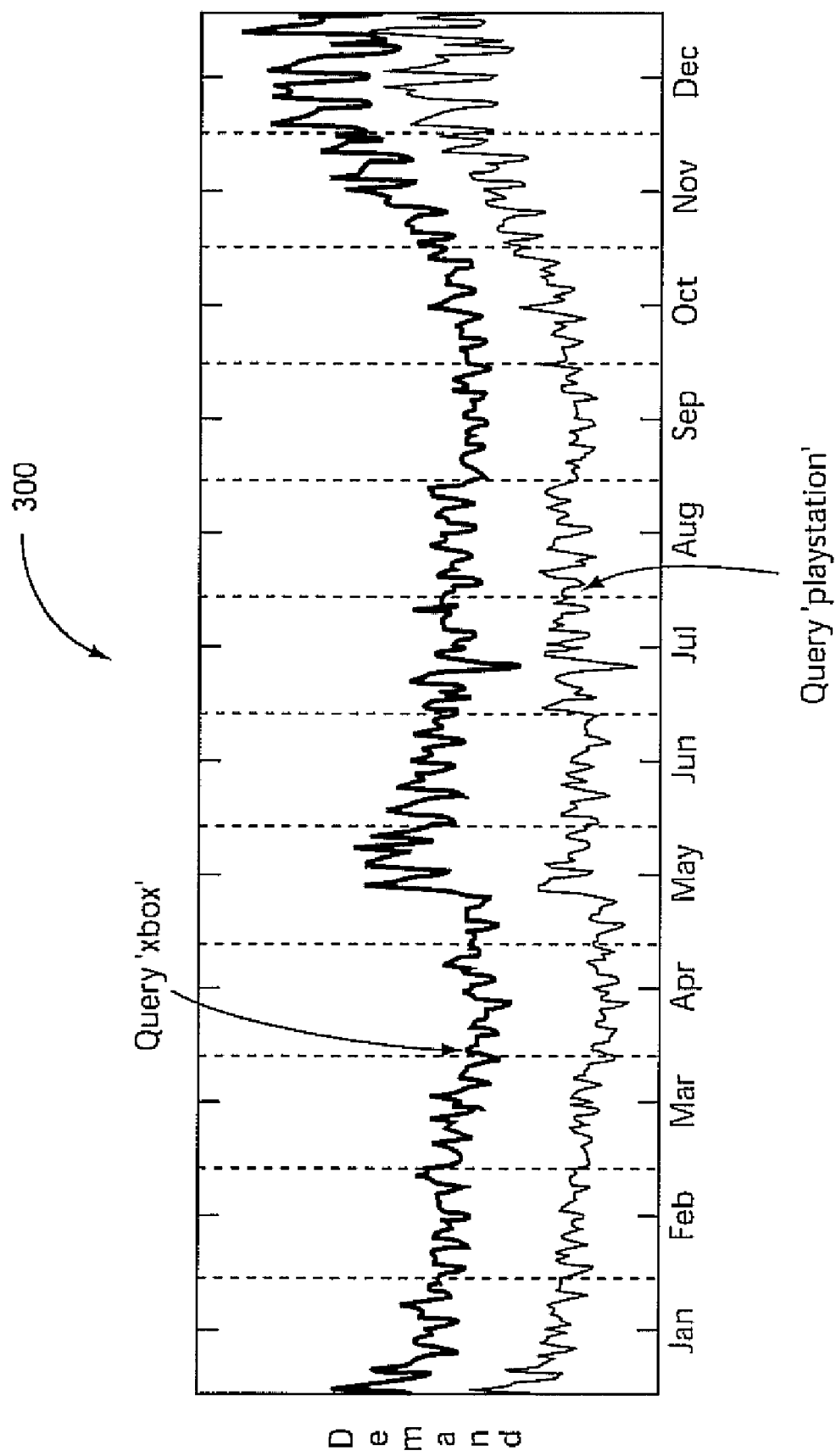
FIG. 3 is a plot of data relating to time (X-axis) versus demand (Y-axis) with respect to queries directed to the terms "XBOX" and "PLAYSTATION" and received over a time period of one year, to which the present principles may be applied, according to an embodiment thereof.

Internet search engines collect vast amounts of data with regards to their online usage, which can effectively assist in describing the evolution of user behavior and search preferences over time. We will describe how to tackle the compression of time-series web logs and their efficient search. We consider temporal sequences that capture the daily demand of search queries. FIG. 3 is a plot of data 300 relating to time (X-axis) versus demand (Y-axis) with respect to queries directed to the terms "XBOX" and "PLAYSTATION" and received over a time period of one year, to which the present principles may be applied, according to an embodiment thereof. This representation of a query can highlight important data parameters. First, one can notice that the two queries exhibit a similar demand pattern. This implies that the two queries are semantically related, which is true since both keywords describe gaming consoles. Secondly, the temporal representation of a query reflects important trends. For the specific example, one can safely deduce that there is a greater demand for game consoles during Christmas. Generally, as previous studies note: "user behavior is deeply related to search keyword[s]" [12]. One can distill this behavior which can prove beneficial in a variety of applications:

(1) Search engine optimization: Understanding the semantic similarity between keywords can assist in constructing more accurate keyword taxonomies and achieving better clustering of keywords. This can serve in providing better search results and ultimately help understand the true relationship between web pages. A number of features can assist in this process, such as repetition in the search behavior, something that is easily conveyed by the temporal representation of the query demand.

Figure 4A:
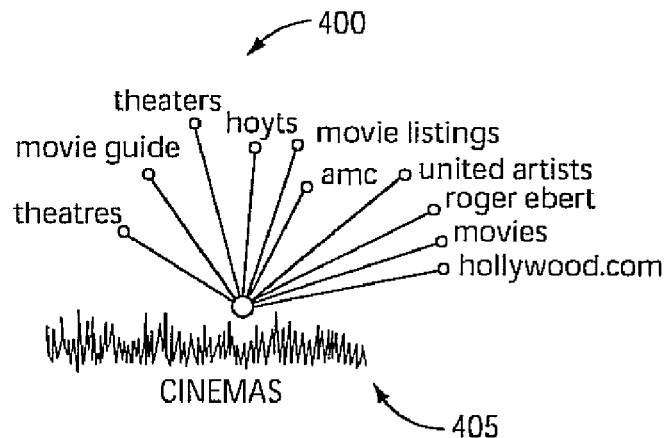
FIG. 4A is a diagram of nearest neighbors for a query directed to the term "cinemas", to which the present principles may be applied, according to an embodiment thereof.

(2) Keyword recommendation: Related queries are manifested by similar demand patterns. A search engine can exploit this characteristic by offering a "maybe you would also be interested in this" functionality. As an illustrative example, FIG. 4A is a diagram of nearest neighbors (queries) 400 for a query 405 directed to the term "cinemas", to which the present principles may be applied, according to an embodiment thereof. All the results are highly interpretable and include queries such as "movie guide", "hollywood.com" and "Roger Ebert".

Figure 4B:
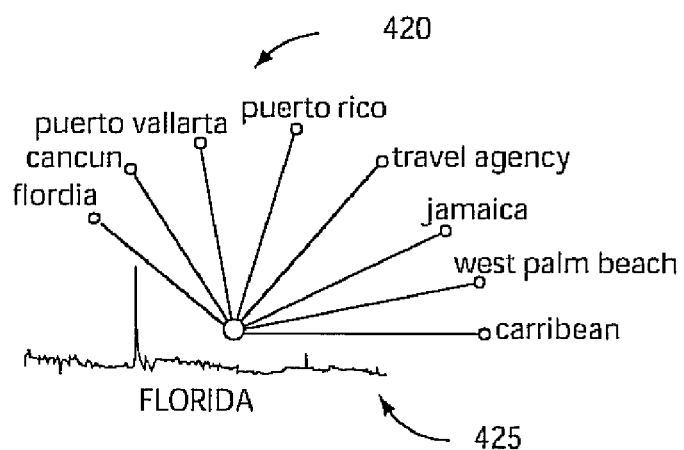
FIG. 4B is a diagram of nearest neighbors for a query directed to the term "Florida", to which the present principles may be applied, according to an embodiment thereof.

(3) Better spelling correction: No dictionary or ontology can cover the wide range of keywords that appear on the web. However, relationships between keywords can be deduced by the systematic study of the query logs [4]. FIG. 4B is a diagram of nearest neighbors (queries) 420 for a query 425 directed to the term "Florida", to which the present principles may be applied, according to an embodiment thereof. Note the presence of the misspelled keyword "Flordia".

(4) Identification of news events: Query logs can help understand and predict behavioral patterns, as described by Adar et al., "Why we Search: Visualizing and Predicting User Behavior", in Proc. of World Wide Web, pp. 161-70, May 2007, the disclosure of which is incorporated by reference herein. Important events usually manifest themselves as bursts in the query demand [8, 15]. News travels fast, and web queries travel even faster, By monitoring increasing demands in a query, search engines can accurately pinpoint developing news events.

(5) Advertising impact: The financial aspect of search engines is materialized by the carefully selected matching of keywords to advertisements. Semantic clustering of queries can, first, assist the search engine in recommending related keywords to the advertisers. Second, seasonal query demand can help define in a more relevant way the price of an advertisement, by elevating the price during times of greater demand for the keyword. This paradigm is similar to the pricing of the TV or radio advertisements, where "prime-time" commercials are valued higher than the remaining time-slots.

A common denominator in all of the above applications is a set of operations that allow for the effective storage and retrieval of the web log data. Given the excessive amount of collected data, there is a pragmatic need for effective data compression. Popular search engines like GOOGLE, MSN AND YAHOO! have data retention periods that lie in the range between 18-30 months. However, data compression on its own has little to offer if it cannot be combined with a fast search mechanism. This mechanism ideally should be tailored to function over the compressed data.

We leverage the smooth and periodic nature of the web log data, to offer a highly effective data compression scheme of the temporal patterns. We utilize the Fourier coefficients with the highest energy for describing the inherent data variability. We demonstrate with various examples that such a compressed data representation can accurately describe most of the data variability and also capture important patterns in the log files. While this provides an excellent compression technique, comparison between the compressed sequences is difficult since they are described by a (possibly) diverse set of coefficients, according to their dominant frequencies. Herein we present techniques that overcome this obstacle. Moreover, we provide a technique for calculating the optimal distance bounds that can be derived using the aforementioned compressed representations. The algorithm is based on solid optimization principles and offers a significant boost in the search performance compared to the current state-of-the-art. The present principles are also of independent interest for general time-series data. The present principles are applicable on any numeric sequence data, and on any orthonormal data transformation.

Searching Temporal Log Data

We consider a database (DB) that stores the temporal sequences $x^{(i)}, i=1 \ldots M$. The general problem that we examine can be abstracted as follows: A user is interested in finding the k most similar sequences to a given query sequence q, under a certain distance metric d. This operation is also known as k-Nearest-Neighbor (NN) search, which is a common function in database search and many data-mining and machine-learning algorithms, including classification (NN-classifier), clustering, and so on. Therefore, the provision of such functionality may be advantageous to any system that attempts to analyze data or make useful deductions. The distance function d that we consider in this work is the Euclidean distance. More flexible measures, including but not limited to time-invariant distances (essentially a Euclidean distance on the periodogram as described by Vlachos et al., "On Periodicity Detection and Structural Periodic Similarity", in Proc. of SDM, pp. 3-12, 2005, the disclosure of which is incorporated by reference herein) could also be used with little to no modifications to our approach. However, for ease of exposition here we focus on the Euclidean distance, which is also the distance measure of preference in most of the related work such as that described by Chien et al., "Semantic Similarity Between Search Engine Queries Using Temporal Correlation", in Proc. of World Wide Web, pp. 2-11, May 2005, and Lie et al., "Measuring the Meaning in Time Series Clustering of Text Search Queries", in Proc. of CIKM, pp. 836-37, November 2005, the disclosures of which are incorporated by reference herein. It is to be noted that correlation is also an instance of Euclidean distance on properly normalized sequences.

Figure 4C:
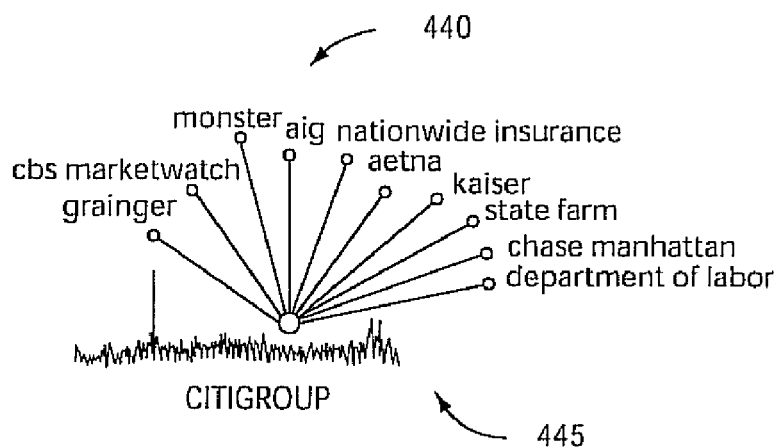
FIG. 4C is a diagram of nearest neighbors for a query directed to the term "CITIGROUP", to which the present principles may be applied, according to an embodiment thereof.

In FIGS. 4A-C, we respectively plot some of the nearest neighbors of the following 3 queries: "cinemas"; "Florida"; and "CITIGROUP". We observe that the results have a high semantic affinity with the posed query. FIG. 4C is a diagram of nearest neighbors (queries) 440 for a query 445 directed to the term "CITIGROUP", to which the present principles may be applied, according to an embodiment thereof. The query 445 returns, for example, other financial or insurance companies. For additional examples on the quality of retrieved matches we direct the interested reader to other relevant publications, for example, as described by Chien et al., "Semantic Similarity Between Search Engine Queries Using Temporal Correlation", in Proc. of World Wide Web, pp. 2-11, May 2005, Adar et al., "Why we Search: Visualizing and Predicting User Behavior", in Proc. of World Wide Web, pp. 161-70, May 2007, Vlachos et al., "Identifying Similarities, Periodicities & Bursts for Online Search Queries", in Proc. of SIGMOD, 12 pages, June 2004, and Vlachos et al., "On Periodicity Detection and Structural Periodic Similarity", in Proc. of SDM, pp. 3-12, 2005.

Figure 5:
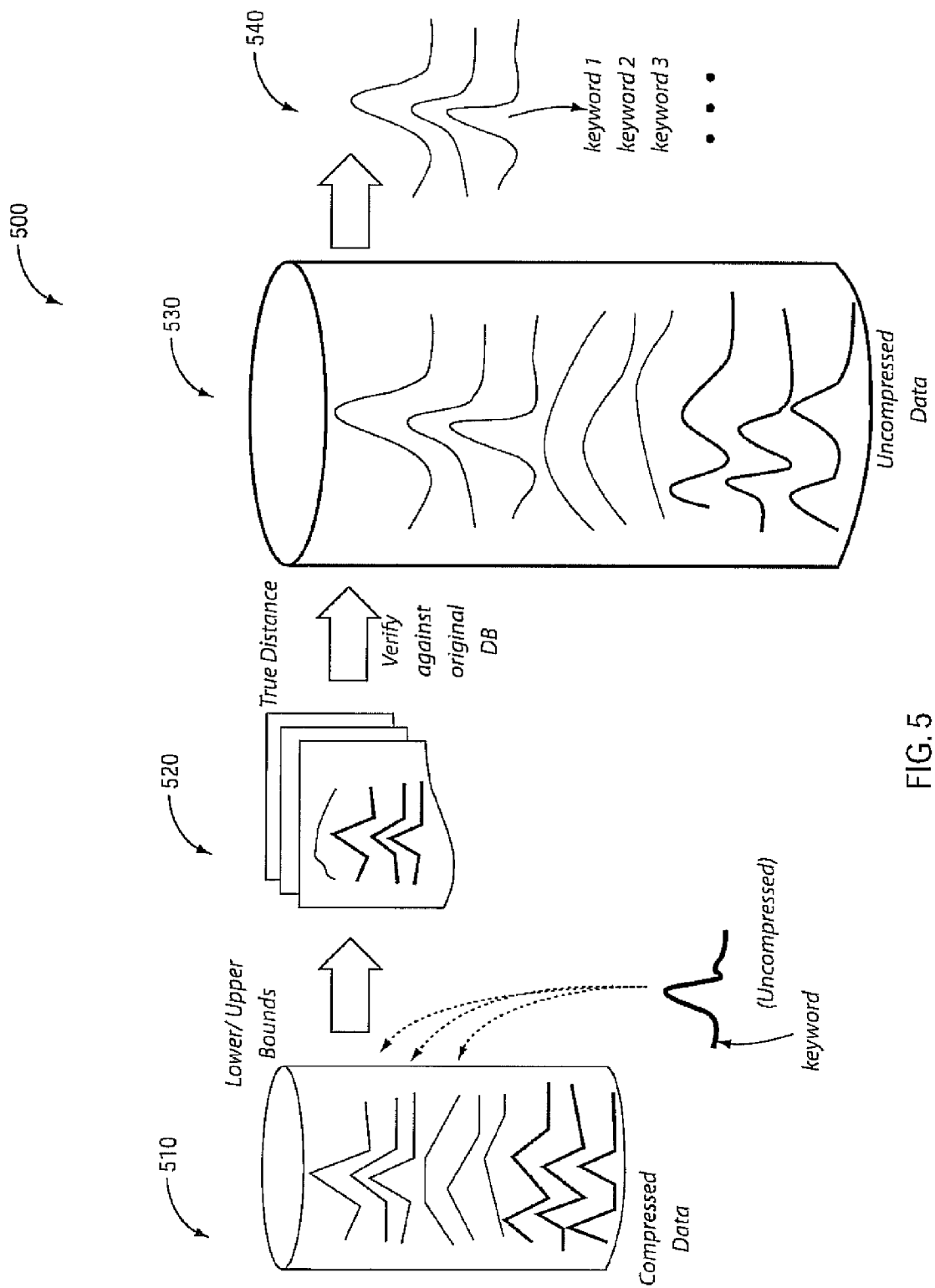
FIG. 5 is a diagram illustrating the general framework for speeding up nearest neighbor search operations, to which the present principles may be applied, according to an embodiment thereof.

Search operations can be quite costly especially for cases where the cardinality of the sequences is quite extensive and the sequence length is also substantial (both cases likely to be encountered in the exemplary applications described herein). This is observed because sequences need to be retrieved from disk in order to be compared to the query q. An effective way to mitigate this cost is to retain a smaller, compressed representation of the sequences, which will be used as an initial pre-filtering step. The set of compressed sequences could be small enough so that it can be kept in-memory, hence lending an even greater performance speedup. Essentially, one is employing a multilevel filtering mechanism. When examining the compressed sequences, we obviously cannot derive the exact distance between the query q and any sequence $x^{(i)}$ in the database. Under-estimates and upper-estimates of the distance will be calculated, which in the literature are also known as lower and upper bounds on the distance function. Using these bounds, a superset of the k-NN answers will be returned, which will be verified against the uncompressed disk-resident sequences. These will be fetched and compared with the query, so that the exact distances can be computed. This methodology is very widely used in the data-mining time-series field and it is the methodology also used in this work. The above steps are summarized in FIG. 5, which is a diagram illustrating the general framework 500 for speeding up nearest neighbor search operations, to which the present principles may be applied, according to an embodiment thereof. The framework 500 involves a simplified database (DB) 510, an answer superset 520, an original database (DB) 530. The output from the simplified database 510 includes lower and/or upper bounds, which are then input to the answer superset 520. The output from the answer superset 520 is a true distance, which is then input to the original database 530 (for verification). The output from the original database 530 is a final answer set 540, including one or more keywords.

Use of Upper and Lower Bounds

Lower/upper bounds on the distance function may serve three purposes. The first purpose is to eliminate from examination candidate sequences that are probably worse than the current best match during the search procedure. The second purpose is to dictate a search order of the disk-resident sequences, so that more promising candidates are examined first, hence providing at an early stage of the search a good candidate match. This will help eliminate subsequent distance sequences from examination. The third purpose is to provide guarantees that the initial data filtering using the compressed data will return the same outcome as when scanning sequentially the original uncompressed data.

Consider that we are seeking the 1-NN match of the query q. By swiftly scanning the compressed representations, the lower and upper bounds of q against all sequences can be derived. We extract the minimum upper bounds $UB_{min}$ and all sequences that have a lower bound greater than $UB_{min}$ can be safely discarded, since obviously a better match can be found (in the form of the sequence with upper bound equal to $UB_{min}$). Next, the uncompressed sequences are retrieved from disk in the order suggested by the lower bounds (LB's), since sequences with smaller LB's are more likely to be closer to the query q. The true distance of each sequence to the query is evaluated and the best-so-far match is possibly updated. Once the LB of the currently retrieved sequence is greater than the (true) distance of the best-so-far match, the search can be terminated since all the remaining sequences are guaranteed to have a greater distance than the best-so-far candidate sequence.

In the general case, where one is searching for the k Nearest-Neighbors (k>1), the only change introduced in the above process is the introduction of a priority queue that holds the k best results, and the algorithm prunes the search space based on the distance of the k-th best-so-far match.

Many optimization techniques on the above procedure can further reduce the search space (e.g., the creation of an index on the compressed features). However, the steps that we described are rudimentary in many search and indexing techniques. Additionally, the aforementioned search procedure constitutes a bias-free approach to evaluate the search performance of a technique, since it does not depend on any implementation details. We employ the aforementioned search procedure in the experimental section, in order to provide an unbiased performance estimator between various lower/upper bounding techniques, since it does not depend on any implementation details, but merely relies on the tightness of the derived bounds.

Obviously, techniques that provide tighter bounds will be able to offer better pruning power and enhanced search performance. Later on, we will provide an algorithm that computes the tightest possible lower and upper bounds, when utilizing the high-energy coefficients of web log sequences. Hereinafter we describe how this compression is achieved.

Compressing Time-Series Data

Query demand patterns exhibit a smooth and highly periodic nature as described by Vlachos et al., "Identifying Similarities, Periodicities & Bursts for Online Search Queries", in Proc. of SIGMOD, 12 pages, June 2004. Therefore it is natural to compress such temporal data utilizing the Fourier transform. Wavelets or PCA could also have invariably been used, without any change in the algorithms that will be described hereinafter. In fact, everything is described hereinafter is applicable on any orthonormal transform.

We begin with some notation first and a brief overview of the Fourier transform. We denote each query as a time series $x=\{x_0, x_2, \ldots, x_{N-1}\}$ and the Fourier transformation of x by the capital letter X.

Discrete Fourier Transform: The normalized Discrete Fourier Transform (DFT) of a sequence x is a vector of complex numbers X(f):

$$X(f_{n/N}) = \frac{1}{\sqrt{N}} \sum_{n=0}^{N-1} x(n) e^{-j2\pi kn/N},$$

$$n = 0, 1 \ldots N - 1$$

Each of the complex numbers encodes the amplitude and phase of a sinusoid with frequency f, and the sum of all sinusoids reconstructs the original sequence.

Periodogram: The energy of all Fourier coefficients is denoted by the periodogram P, which is a vector that includes the squared magnitude of the coefficients:

$$P(f_{n/N}) = \|X(f_{n/N})\|^2,$$

$$n = 0, 1 \ldots \left\lceil \frac{N-1}{2} \right\rceil$$

The most dominant frequencies appear as peaks in the periodogram (and correspond to the coefficients with the highest magnitude). As used herein with respect to one or more embodiments, when we refer to the best or largest coefficients, we are referring to the coefficients that have the highest energy and correspond to the tallest peaks of the periodogram. One could reconstruct a portion of the signal using just any set of frequencies, but typically the peaks on the periodogram would correspond to the important data frequencies. These are the coefficients that we use to compress each query sequence.

Figure 6A:
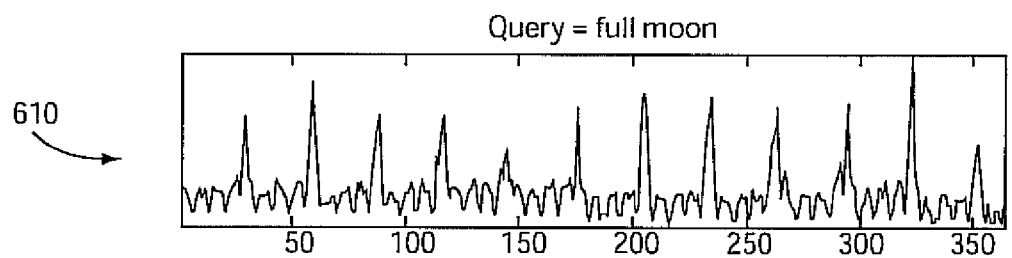
FIG. 6A is a diagram of a demand pattern for a query directed to the phrase "full moon", to which the present principles may be applied, according to an embodiment thereof.
Figure 6B:
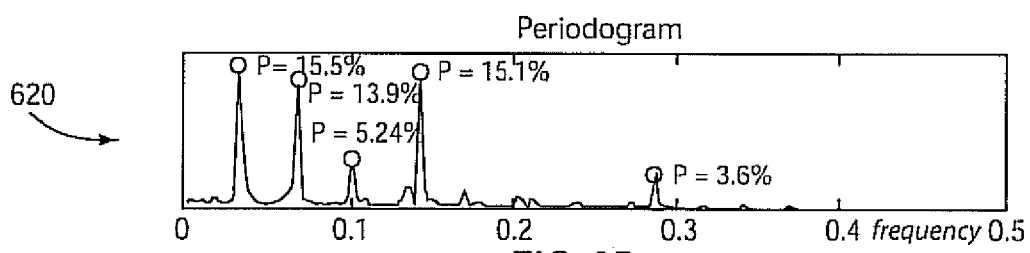
FIG. 6B is a diagram of a periodogram for a query directed to the phrase "full moon", to which the present principles may be applied, according to an embodiment thereof.
Figure 6C:
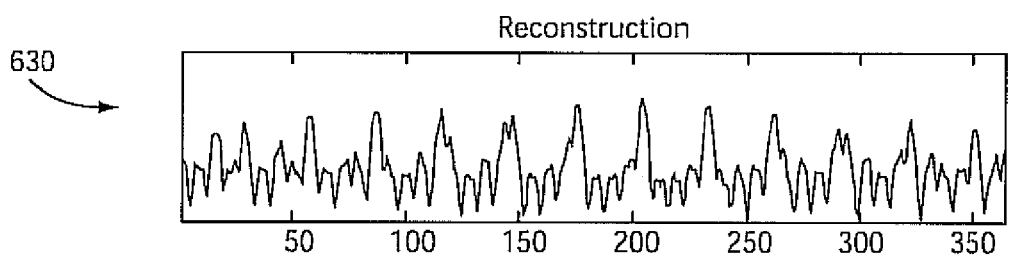
FIG. 6C is a diagram of a reconstruction of a demand pattern for a query directed to the phrase "full moon", to which the present principles may be applied, according to an embodiment thereof.

Example: FIG. 6A is a diagram of a demand pattern 600 for a query directed to the phrase "full moon", to which the present principles may be applied, according to an embodiment thereof. FIG. 6B is a diagram of a periodogram 620 for a query directed to the phrase "full moon", to which the present principles may be applied, according to an embodiment thereof. FIG. 6C is a diagram of a reconstruction 630 of a demand pattern for a query directed to the phrase "full moon", to which the present principles may be applied, according to an embodiment thereof;

Consider the demand pattern 610 in FIG. 6A. The periodogram 620 in FIG. 6B (which summarizes the energy of the signal frequencies) includes very few frequencies that hold the majority of the signal energy. For example, 2 of the peaks on the periodogram 620 correspond to a monthly and a weekly periodicity. That is, people ask for the specific query approximately every month and every week. Since the data is composed of few frequencies, the data can be compressed or summarized accurately using limited data. In FIG. 6C, we show the high quality reconstruction 640 that is achieved when using the coefficients with the highest energy. We will utilize the Fourier coefficients with the highest energy signature for compressing the underlying temporal demand pattern of each query.

Therefore, each compressed query sequence X will be described by a set of c coefficients that hold the largest energy. The vector describing the positions of those coefficients in X is denoted as $p^+$, while the positions of the remaining ones as $p^-$ (that is $p^+, p^- \subset [1, \ldots N]$). For any sequence X, we will also store in the database the vector $X(p^+)$ or equivalently $X^+$. Now if Q is a query in the transformed domain, then $Q(p^+)$ (or $Q^+$) describes a sequence holding the equivalent coefficients as the vector $X(p^+)$. Similarly, $Q(p^-) \equiv Q^-$ is the vector holding the analogous elements of $X(p^-) \equiv X^-$.

Example: Suppose $X=\{(1+2i), (2+2i), (1+i), (5+i)\}$ and $Q=\{(2+2i), (1+i), (3+i), (1+2i)\}$. The magnitude vector of X is: $\|X\|=\{2.23, 2.82, 1.41, 5.09\}$. Then, $p^+=\{2, 4\}$, $X(p^+)=\{(2+2i), (5+i)\}$ and $Q(p^+)=\{(1+i), (1+2i)\}$.

Figures 7A, 7B, 7C, 7D, 7E:
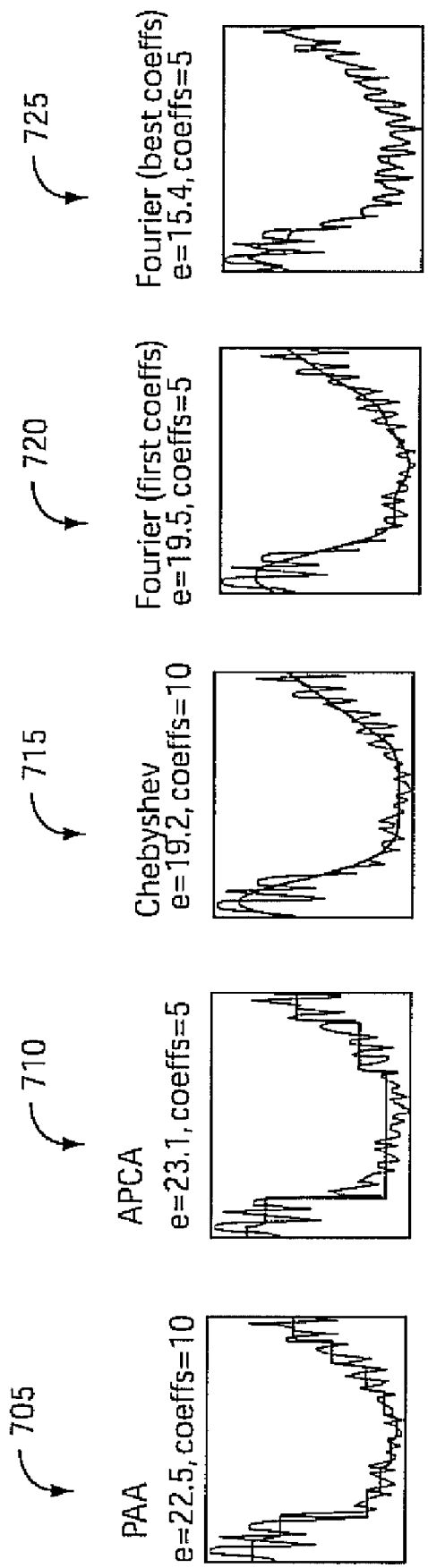
FIGS. 7A-J are diagrams illustrating various compression technologies on query web logs, to which the present principles may be applied, according to an embodiment thereof.
Figure 7F:
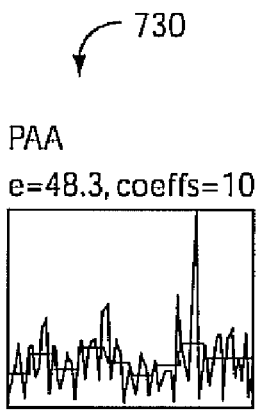
Figure 7G:
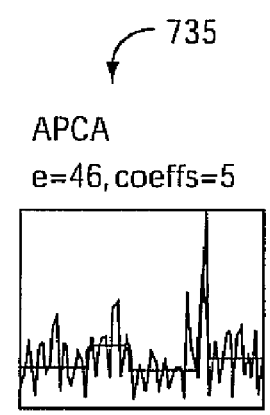
Figure 7H:
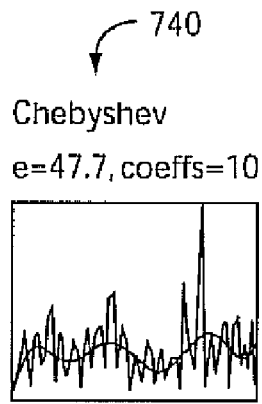
Figure 7I:
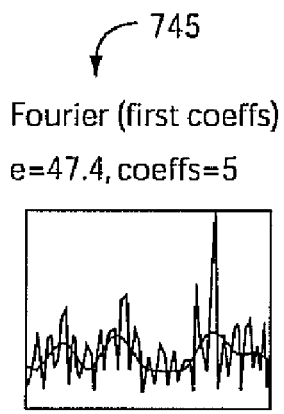
Figure 7J:
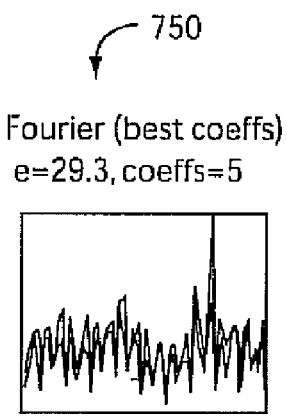

Traditionally, previous work considers compression of time-series data using the same set of orthogonal coefficients because this allows for easier comparison of the respective coefficients and for adaptation of traditional indexing structures such as, for example, R-trees. FIGS. 7A-J are diagrams illustrating various compression technologies (705, 710, 715, 720, 725, 730, 735, 740, 745, and 750, respectively) on query web logs, to which the present principles may be applied, according to an embodiment thereof. FIGS. 7A-7E are for a query directed to the term "skiing", and FIGS. 7F-7J are for a query directed to the term "Greece". FIG. 7A represents Piecewise Aggregate Approximation (PAA) compression technology 705 with 10 coefficients and an error value of 22.5, FIG. 7B represents Adaptive Piecewise Constant Approximation (APCA) compression technology 710 with 5 coefficients and an error value of 23.1, FIG. 7C represents Chybechev Polynomials 715 with 10 coefficients and an error value of 19.2, FIG. 7D represents Fourier (first) coefficients 720 with 5 coefficients and an error value of 19.5, and FIG. 7E represents Fourier (best) coefficients 725 with 5 coefficients and an error value of 15.4. FIG. 7F represents Piecewise Aggregate Approximation (PAA) compression technology 730 with 10 coefficients and an error value of 48.3, FIG. 7G represents Adaptive Piecewise Constant Approximation (APCA) compression technology 735 with 5 coefficients and an error value of 46, FIG. 7H represents Chybechev Polynomials 740 with 10 coefficients and an error value of 47.7, FIG. 7I represents Fourier (first) coefficients 745 with 5 coefficients and an error value of 47.4, and FIG. 7J represents Fourier (best) coefficients 750 with 5 coefficients and an error value of 29.3. First Fourier coefficients are further described by Agrawal et al., "Efficient Similarity Search in Sequence Databases", in Proc. of Foundations of Data Organizations (FODO), 15 pages, 1993, the disclosure of which is incorporated by reference herein.

We observe that the sequence reconstruction error e using the best Fourier coefficients (last column) is very low, indicating the merits of the proposed compression technique.

In addition to the best coefficients of a sequence, we will also record the energy of the discarded coefficients as follows: $e_X = \|\mu X^-\|^2$, the sum of squares of the omitted coefficients. This quantity represents the error in the compressed representation, or, equivalently, the amount of energy in the coefficients not represented.

Searching Compressed Time-Series Data

Considering the above we have all the elements for describing our problem setting. Given an uncompressed query q, we need to find the closest sequences x in the database, based on the Euclidean distance ($L_2$-Norm). Parseval's theorem dictates that the Euclidean distance is the same whether computed in the time or in the frequency domain. The preservation of energy holds for any orthonormal transform (wavelets, PCA, etc.), so anything mentioned from now on, is applicable on a variety of data transforms. The distance can be decomposed as follows:

$$D(x, q)^2 = D(X, Q)^2 \text{(Parseval)} \quad (1)$$
$$= D(X^+, Q^+)^2 + D(X^-, Q^-)^2$$
$$= \|X^+ - Q^+\|^2 + \|X^- - Q^-\|^2$$

Since, $X^-$ is unknown, the exact value of $\|X-Q\|^2$ cannot be calculated. However, the computation of the first part of the distance is trivial since we have all the required data. For the second part we are missing the term $X^-$, the discarded coefficients. Since we have compressed each sequence X using the best coefficients, we know that the magnitude of each of the coefficients in $X^-$ is less than the smallest magnitude in $X^+$. We use $\text{minPower}=\|X_{min}^+\|$ to denote the magnitude of the smallest coefficient in $X^+$.

We can estimate the range of values within which $\|X^- - Q^-\|^2$ lies, by expressing it as an optimization problem. In particular, we can express it as two optimization sub-problems. As a maximization problem when considering the upper-bound distance, and as a minimization problem when attempting to establish the lower-bound distance, the following apply:

$$\|X^+ - Q^+\|^2 + \min\|X^- - Q^-\|^2 \le \|X - Q\|^2$$

and $$\|X - Q\|^2 \le \|X^+ - Q^+\|^2 + \max_{X^-}\|X^- - Q^-\|^2.$$

For example if we wish to discover a right upper bound on the distance, we need to provide a solution for the following optimization problem:

$$\max_{X^-}\|X^- - Q^-\|^2 \quad (2)$$

such that $$\|X^-\|^2 = e_X \quad (3)$$

$$\|X_i^-\| \le \text{minPower}, \quad (4)$$

and $$\min_{X^-}\|X^- - Q^-\|^2 \quad (5)$$

such that $$\|X^-\|^2 = e_X \quad (6)$$

$$\|X_i^-\| \le \text{minPower} \quad (7)$$

where $X_i^-$ is the $i^{th}$ component of the $X^-$.

The algorithm that we provide is the optimal, that is, the bounds that we compute are the tightest possible to the original distance. To our best of knowledge, this is the first work that offers such bounds. First we provide an intuition regarding our solution to the problem. Initially, on 2-dimensions and then on n-dimensions. Hereinafter, we include a formal proof regarding the optimality of our solution.

Optimal Distance Bounds

Algorithm Intuition on 2D

We demonstrate the optimal solution with a simple example. For this example we assume that $\vec{X}$ and $\vec{Q}$ are 2-dimensional real vectors. We first find the optimal upper bound and later the optimal lower bound. For the optimal upper bound calculation, $\|Q^+ - X^+\|$ is known and we want to find the following $$\max_{X^-}\|X^- - Q^-\|^2 \quad (8)$$

such that $e_x = \sqrt{(X_1^-)^2 + (X_2^-)^2}$ and $\|X_i^-\| \le \text{minPower}$, $i=1,2$.

Figure 8D:
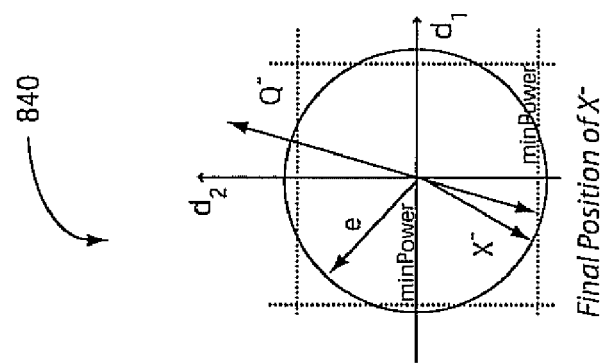
FIGS. 8A-D are plots relating to the approximation of coefficients for use in determining optimal distance bounds for compressed time-series data given two constraints, in accordance with an embodiment of the present principles.
Figure 8C:
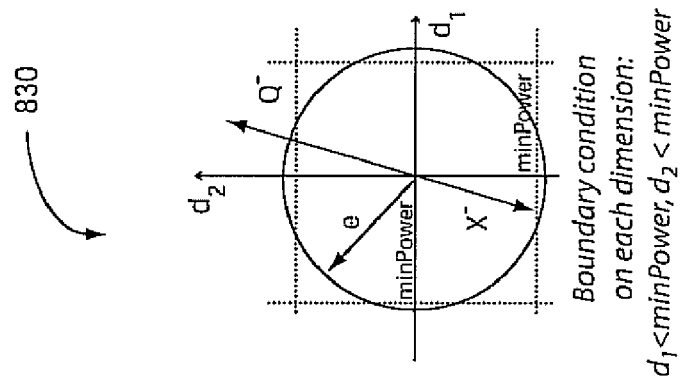
Figure 8B:
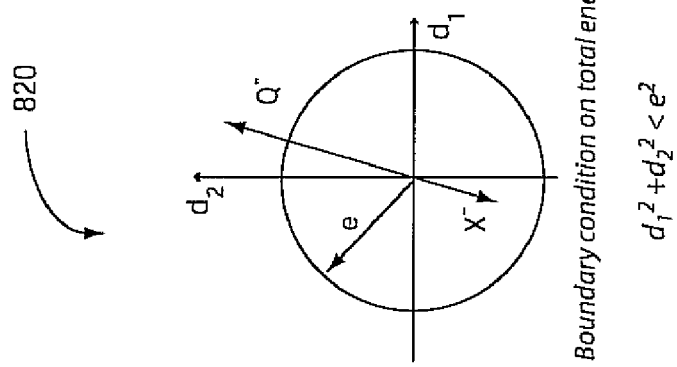
Figure 8A:
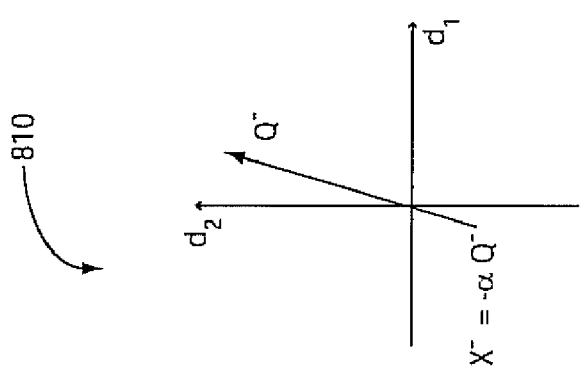

Intuitively, given the query $Q^-$, the vector which will maximize $\|Q^- - X^-\|^2$ should be on the opposite direction of $Q^-$, i.e., $X^- = -\alpha Q^-$ for some $\alpha > 0$, as seen in the plot of optimal distance bounds of FIG. 8A. FIGS. 8A-D are plots relating to various steps (810, 820, 830, and 840) for approximating coefficients for use in determining optimal distance bounds for compressed time-series data given two constraints, in accordance with an embodiment of the present principles. In the example of FIGS. 8A-D, only two coefficients (i.e., $d_1$ and $d_2$) are approximated. The first constraint is the total available energy (indicated by the circle) and the second constraint relates to each coefficient (indicated by the horizontal and vertical lines at minPower) as described further herein below.

Let's also plot on the same figure the following two constraints:

(1) Notice that the constraint on the total available energy $e_x$ essentially is translated into a circle on the 2D plane (FIG. 8B). Therefore the unknown vector $X^-$ should always lie within this circle, otherwise the energy constraints will be violated.

(2) The constraint on each coefficient of $X^-$ indicates that they should not exceed minPower, therefore cannot go further than the dotted vertical and horizontal lines at position min-Power on the two dimensions/axes, $d_1$ and $d_2$ (FIG. 8C).

The algorithm proceeds as follows; we begin to scale $X^-$ in the opposite direction of the known $Q^-$ by increasing a, so as maximize the distance $\|Q^- - X^-\|^2$. Now, one of two things may happen. Either we hit on the minPower boundary on one of the axes or we pass the circle indicating the total energy (whichever is violated first). As indicated in FIG. 8C, suppose that we encounter first the boundary condition on one of the axes, e.g., on axis $d_1$. Then we keep the corresponding dimension fixed at $\|X_2^-\|$=minPower, i.e., $\|X_2^-\|$=-minPower, and only scale the vector $X^-$ on the remaining dimensions until we use all the remaining energy or until we encounter another boundary condition. Thus, now we start increasing $X^-$ along the $d_1$ dimension. We can only scale it up to a certain point, because we are faced with the total energy boundary (the circle). At that point, the search stops because all conditions of the maximization problem have been satisfied.

In a similar fashion, if we want to find the lower bound, we have to solve the following:

$$\min_{X^-} \|X^- - Q^-\|^2$$

such that $e_x = \|X^-\|$ and $\|X_i^-\| \leq$ minPower, i=1,2.

However, intuitively, given the query $Q^-$, the vector which will minimize $\|Q^- - X^-\|^2$ should be on the same direction of $Q^-$, i.e., $X^- = \alpha Q^-$ for some $\alpha > 0$. Since, the boundary conditions are symmetric, if we proceed as the maximization problem, we observe that the vector $-X^{-'*}$ yields the minimizer solution where $-X^{-'*}$ is the solution to the maximization problem.

We note that we do not have to solve the optimization problem twice, but only once since the two problems are identical.

Algorithm on n-Dimensions

We now show how the algorithm operates in n-dimensions to allow better exposition of our ideas. We depict the maximization problem.

FIGS. 9A-F are diagrams illustrating steps (910, 920, 930, 940, 950, and 960, respectively) of an optimization (water-filling) algorithm in n-dimensional space, to which the present principles may be applied, according to an embodiment thereof.

Figure 9A:
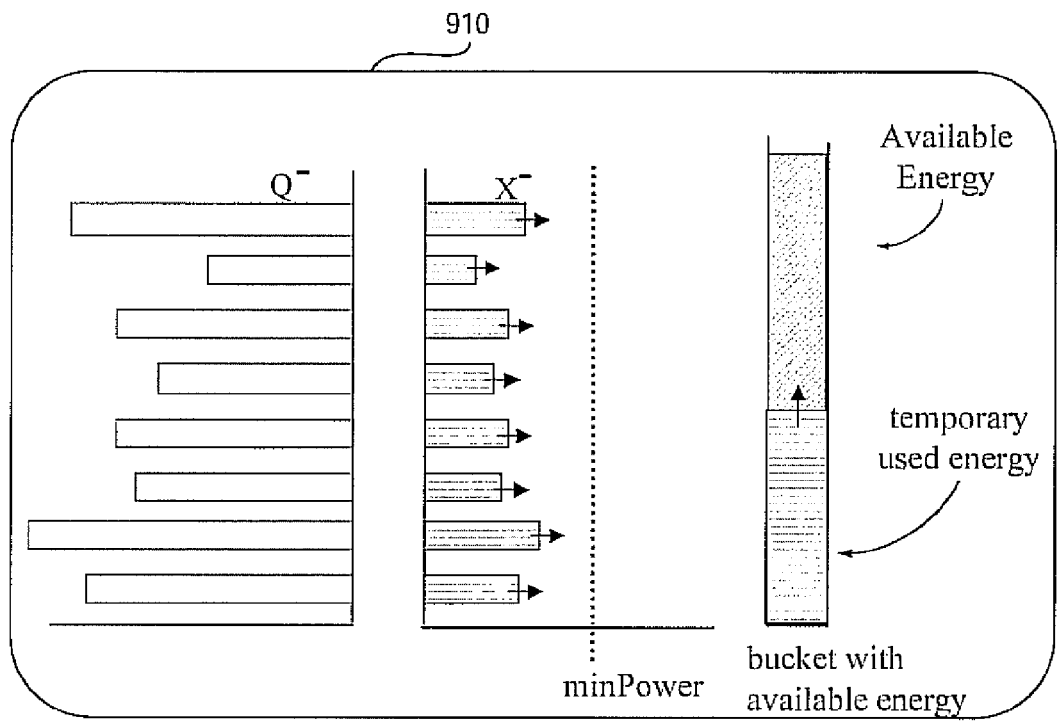
FIGS. 9A-F are diagrams illustrating steps of an optimization (water-filling) algorithm in n-dimensional space, to which the present principles may be applied, according to an embodiment thereof.
Figure 9B:
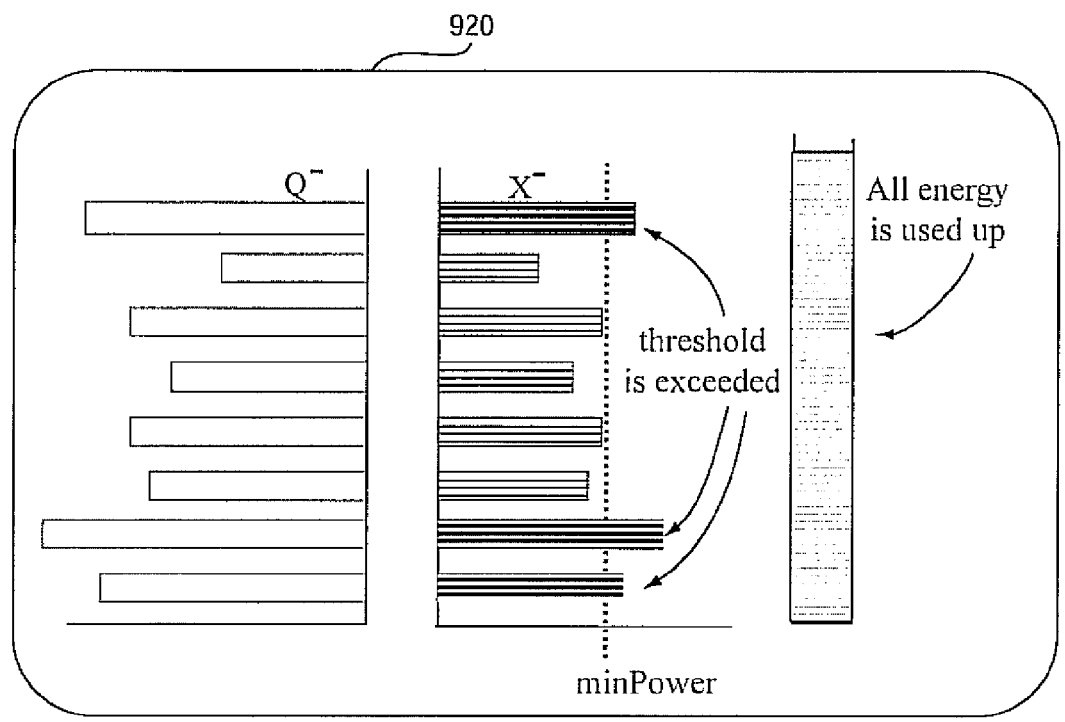
Figure 9C:
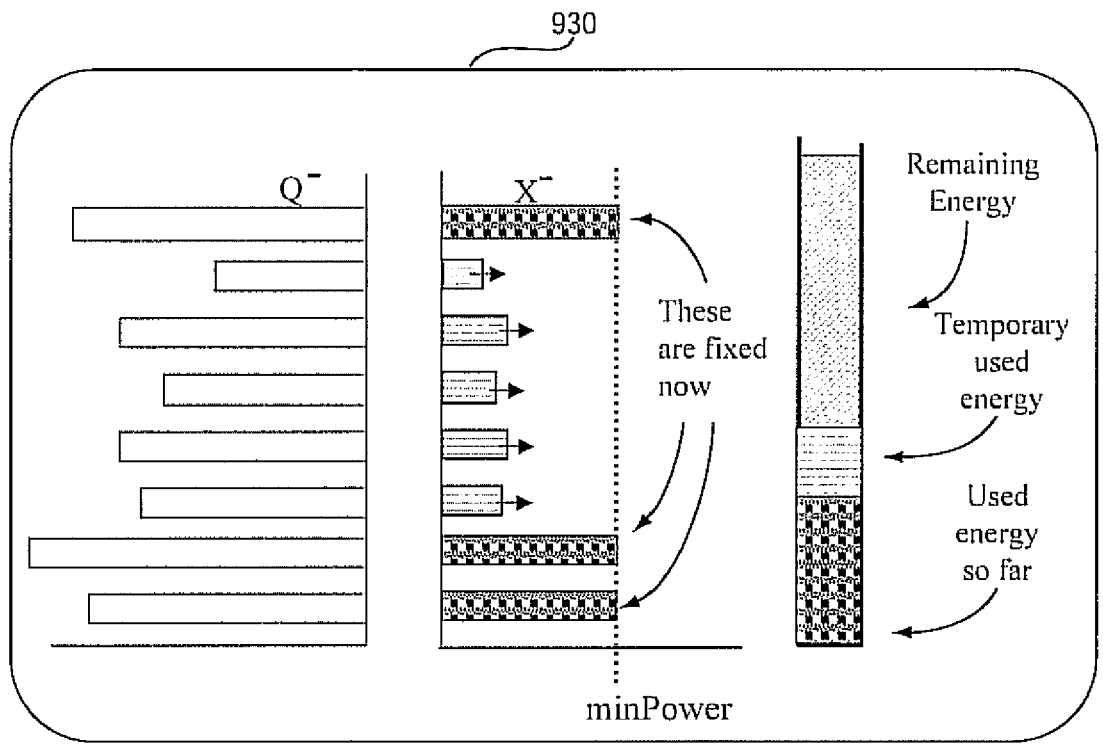
Figure 9D:
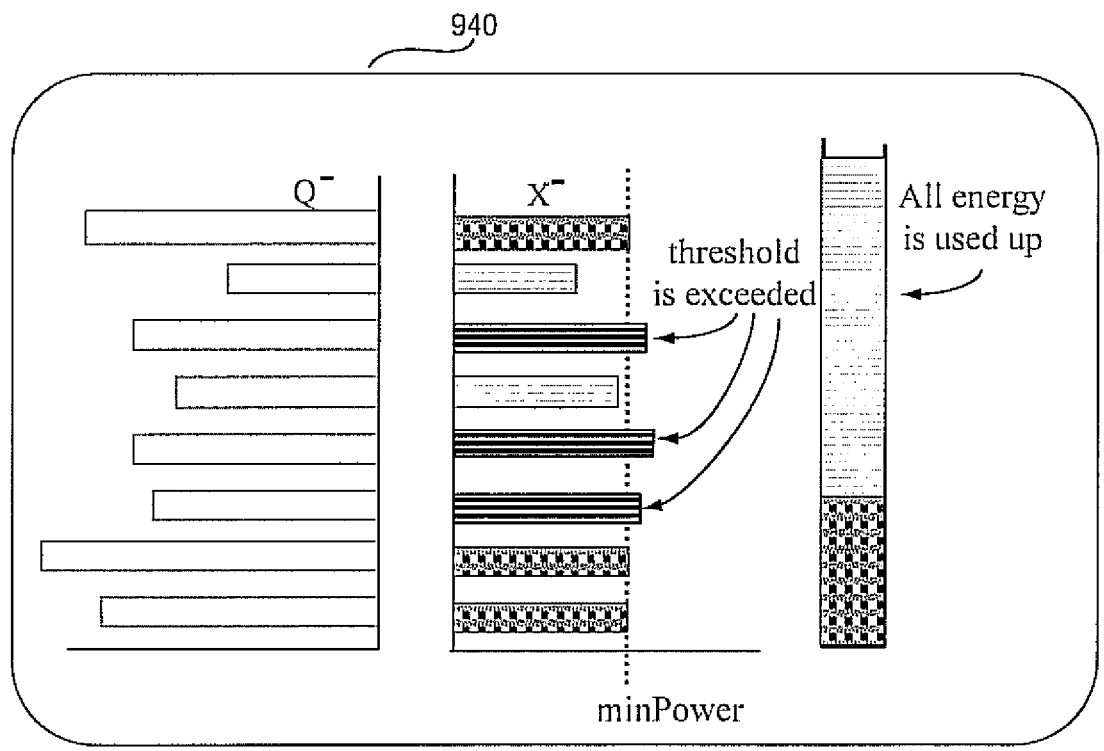
Figure 9E:
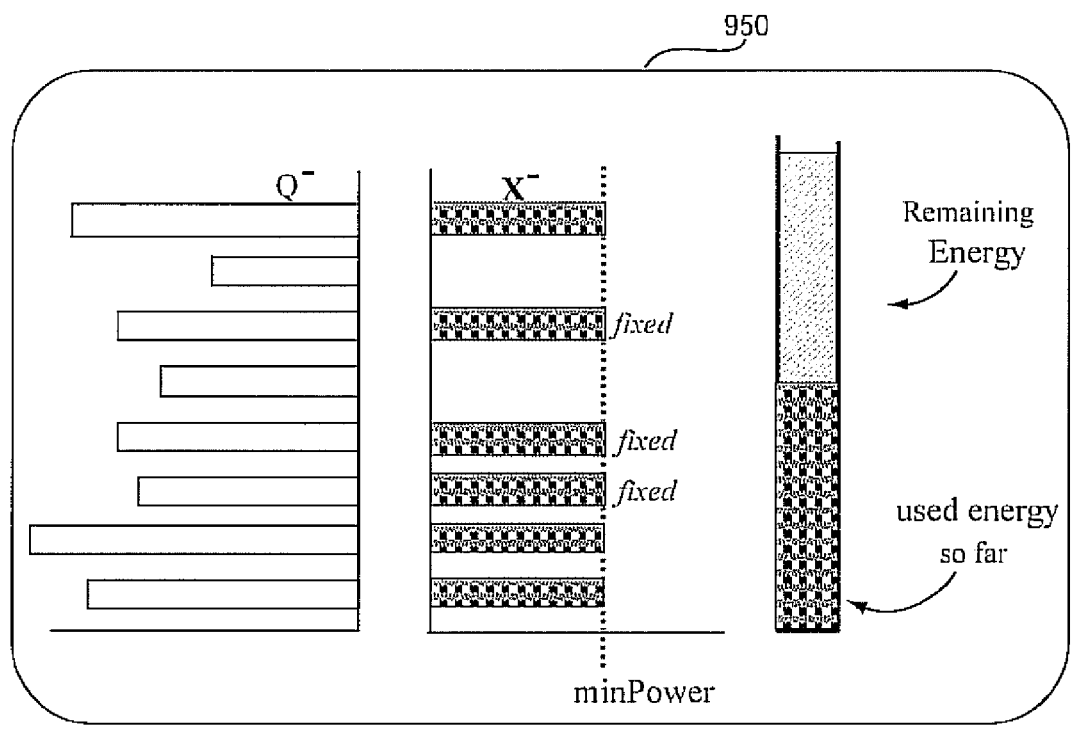
Figure 9F:
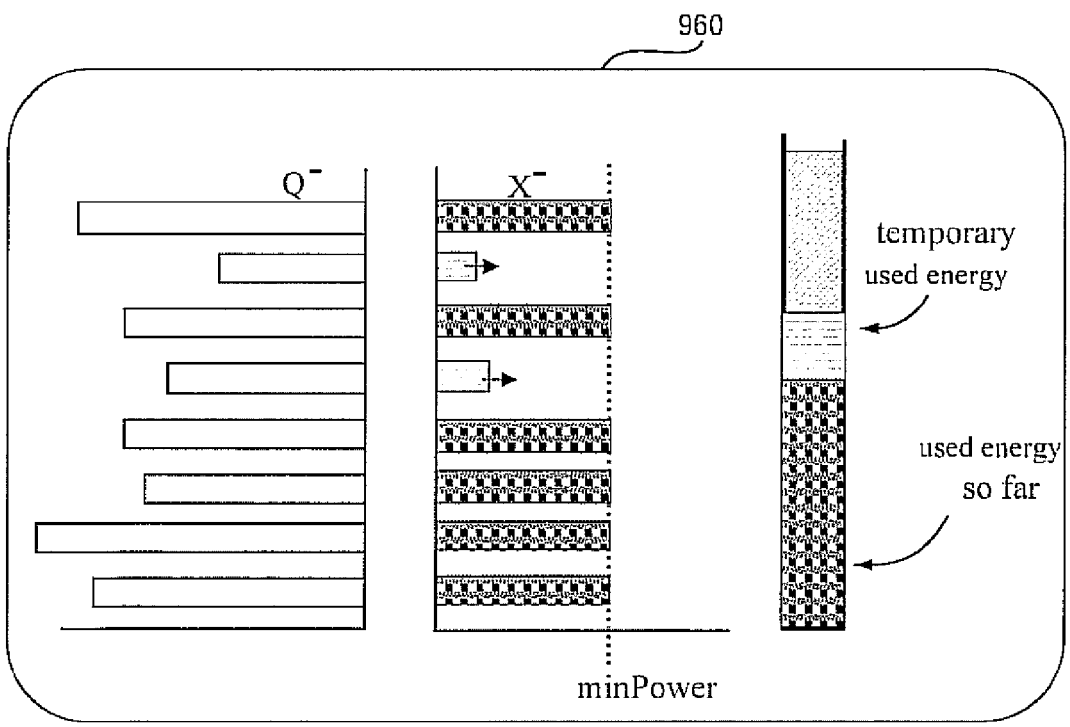
Figure 12A:
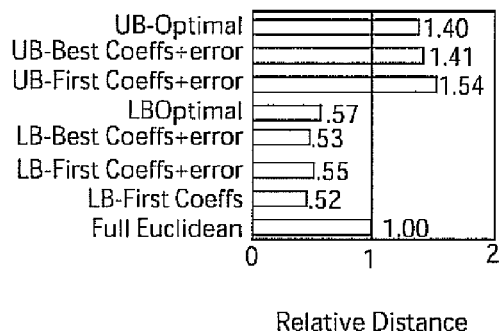
FIGS. 12A-D are diagrams illustrating lower and upper bounds returned by various techniques, across different compression rates, in accordance with an embodiment of the present principles.
Figure 12B:
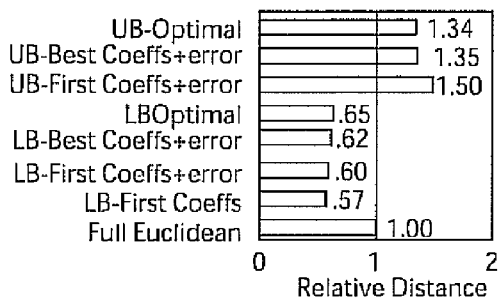
Figure 12C:
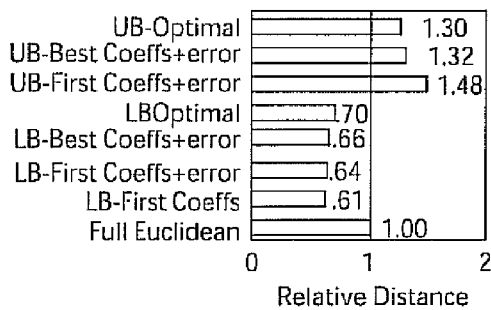
Figure 12D:
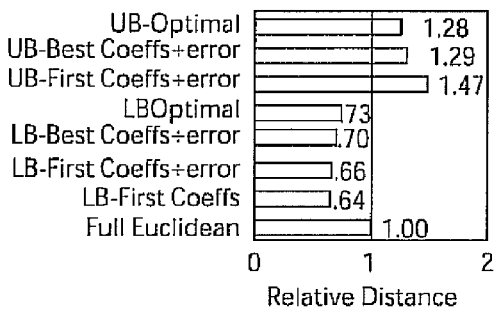

Step 910 of FIG. 9A shows the known vector $Q^-$ and the (unknown yet) vector $X^-$ which we attempt to estimate. With respect to step 920 of FIG. 9B, we also depict on the right a bucket indicating the available energy that we can allocate on $X^-$. In the previous example, we mentioned that vector $X^-$ needs to be on the opposite direction of vector $Q^-$, which translates to creating a rescaled vector of $Q^-$ along that direction. $X^-$ is rescaled until all the energy is used up (step 920 of FIG. 9B). If certain coefficients exceed the minPower constraint, they are truncated/fixed to minPower (step 930 of FIG. 9C). The energy that is allotted for the coefficients that are now fixed is subtracted from the total available energy (step 930 of FIG. 9C). For the remaining coefficients we repeat the same process, as shown in steps 940-960 of FIGS. 9D-F, respectively, until all the available energy is used, or all the unknown coefficients are approximated (fixed).

The configuration described above is a water filling solution and it is shown to be optimal herein below. FIG. 10 is a diagram illustrating exemplary pseudocode 1000 for a solution to an optimization problem, in accordance with an embodiment of the present principles.

Bounds Between Two Compressed Sequences

What we described so far is how to compute the optimal lower/upper bounds between an uncompressed sequence (query) and a compressed sequence, using the described water filling algorithm.

In certain situations, both sequences might be compressed. The main idea remains the same here too. In this case we will perform two water-fillings. One with respect to the first sequence and one with respect with the second sequence. In this case, we can still compute the optimal (tightest) lower and upper bounds on the distance.

Experiments

We evaluate various parameters of our algorithm, such as the convergence rate, the tightness of the estimated bounds, and the additional pruning power that is achieved when using the presented optimal algorithm. As our test bed we use search engine logs spanning a period of 3 years (3*365 points per sequence), which we trim down to 1024 points in order to simplify calculations and exposition of ideas. The sequences were "studentized" (i.e., mean value was subtracted and sequences normalized by the standard), so as to remove any scale bias. In this way we are reverting the distance into a measurement of correlation and can discover more flexible patterns.

Convergence Rate

The proposed water-filling algorithm iteratively rescales subsets of the unknown coefficients in order to utilize the known total signal energy. A number of iterations are required until convergence. Here, we empirically demonstrate that the algorithm reaches the solution in very few iterations (typically 2 to 3), therefore performance of the algorithm is not adversely impacted. The experiment is conducted by computing 1000 distance calculations (lower and upper bounds) from a pool of randomly selected query logs. We repeat the experiment for various compressed representations, retaining from 8 to 64 coefficients per sequence or, in other words, for compression rates of $$\frac{128}{1} \text{ to } \frac{16}{1}.$$

FIGS. 11A-H are histograms 1105, 1110, 1115, 1120, 1125, 1130, 1135, and 1140, respectively, of the number of iterations for convergence on the optimization algorithm represented by FIGS. 9A-F, in accordance with an embodiment of the present principles. We observe that the algorithm converges very fast, typically in 1 to 4 iterations, with the majority of the cases being 2-3 iterations.

Notice that most search operations are I/O bound, and the small additional cost that our algorithm incurs is only CPU-based. However, as we will show, our algorithm achieves much tighter distance bounds which ultimately leads to a great reduction on the uncompressed sequences that are fetched from the disk.

Bound Tightness

Now we compare the tightness of our bounds against widely used time-series search techniques, which have appeared in the data-mining literature. The straw men approaches that we compare with are:

(1) First Coefficients: Techniques that compute bounds on the distance using the first coefficients inherently make the assumption that the underlying signal includes primarily low frequency components as described by Agrawal et al., "Efficient Similarity Search in Sequence Databases", in Proc. of Foundations of Data Organizations (FODO), 15 pages, 1993, and Rafiei et al., "Efficient Retrieval of Similar Time Sequences Using dft", in Proc. of Foundations of Data Organizations (FODO), 9 pages, November 1998, the disclosures of which are incorporated by reference herein. Such approaches perform sufficiently on random walk signals, such as stock market data, but in general do not adapt well for generic signals. Additionally, such approaches only estimate lower bounds on the distance function and therefore, in general, cannot match the pruning performance that the combination of lower/upper bounds can achieve.

(2) First Coefficients+error: This approach augments the aforementioned methodology by recording also the reconstruction error (or remaining energy of the omitted coefficients), which improves upon the previous bounds. This work additionally utilizes upper bounds, which the previous approaches did not consider, as described by Wang et al., "Multilevel Filtering for High Dimensional Nearest Neighbor Search", in ACM SIGMOD Workshop on Research Issues in Data Mining and Knowledge Discovery, pp. 1-7, 2000, the disclosure of which is incorporated by reference herein.

(3) Best Coefficients+error: Similar to the previous approach, this technique exploits the coefficients with the highest energy plus the approximation error in order to bound the distance, as described by Vlachos et al., "Identifying Similarities, Periodicities & Bursts for Online Search Queries", in Proc. of SIGMOD, 12 pages, June 2004, the disclosure of which is incorporated by reference herein.

Space Requirements

Notice that it is not meaningful to directly compare the above approaches using the same number of coefficients, because each technique may require a different amount of storage space. We need to compare all approaches under the same memory requirements.

The storage of the first c Fourier coefficients requires just 2c doubles (or 2c*8 bytes). However, when utilizing the c best coefficients for each sequence, we also need to store their positions in the original DFT vector. That is, the compressed representation with the c largest coefficients is stored as pairs of [position-coefficient].

For our experiments, the sequences are composed of 1024 points, which means that we need to store 512 positions, if we consider the symmetric property of the Fourier coefficients. Nine bits would be sufficient to describe any of the coefficient positions, however, since on disk we can write only multiples of bytes, each position requires 2 bytes. Therefore, each approach that utilizes the best coefficients allocates 16+2 bytes per coefficient. In other words, if an approach storing the first coefficients uses c coefficients, then our method will use $\lfloor 16c/18 \rfloor = \lfloor c/1.125 \rfloor$ coefficients.

For some distance measures we also use one additional double to record the error (sum of squares of the remaining coefficients). For the measures that do not use the approximation error we need to allocate one additional number and we choose this to be the middle coefficient of the full DFT vector, which is a real number (since we have real data with lengths of powers of two). If in some cases the middle coefficient happens to be one of the c best ones, then these sequences just use 1 less double than all other approaches. TABLE 1 summarizes how the same amount of memory is allocated for each compressed sequence of every approach.

TABLE 1

| First Coeffs | c First Coeffs + Middle Coeff |
|---|---|
| First Coeffs+ | c First Coeffs + Error |
| Best Coeffs+ | $\lfloor c/1.125 \rfloor$ Best Coeffs + Error |
| Optimal | $\lfloor c/1.125 \rfloor$ Best Coeffs + Error |

Therefore, when in the following figures we mention memory usage of [2*(32)+1] doubles, the number in parenthesis essentially denotes the coefficients used for the methods using the first coefficients (+1 for the middle coefficient or the error, respectively). For the same example, approaches using the best coefficients will use the 28 best coefficients but have the same memory requirements.

Results

We plot the lower and upper bounds derived by each approach and we normalize the results against the exact Euclidean distance. Numbers closer to 1 indicate tighter bounds. We observe that in all cases the optimal algorithm returns the best distance estimates compared to the other approaches, even though it uses fewer coefficients than some of the competing methodologies. FIGS. 12A-D are diagrams illustrating comparison results (1210, 1220, 1230, and 1240, respectively) for lower and upper bounds returned by various techniques, across different compression rates, in accordance with an embodiment of the present principles. In the diagrams, we indicate how much the optimal algorithm improves on the "First Coeffs+error" approach. The best improvement is achieved when using 32 coefficients and the improvement reaches approximately 10% on the lower bounds and 13% on the upper bounds. As we will demonstrate hereinafter, this reduction in the distance ambiguity can lead to very dramatic speedups in the overall search performance.

Pruning Power and Performance Improvement

For this experiment we assemble a large pool of query web logs that include 32000 temporal sequences. We pose 100 random queries that do not have exact matches in order to offer more realistic performance metrics. We search for the 1-Nearest-Neighbor of each query and we utilize both Lower and Upper bounds. For the "First Coeffs" approach we utilize only the lower-bounds, since no upper-bounds are offered.

Figure 13A:
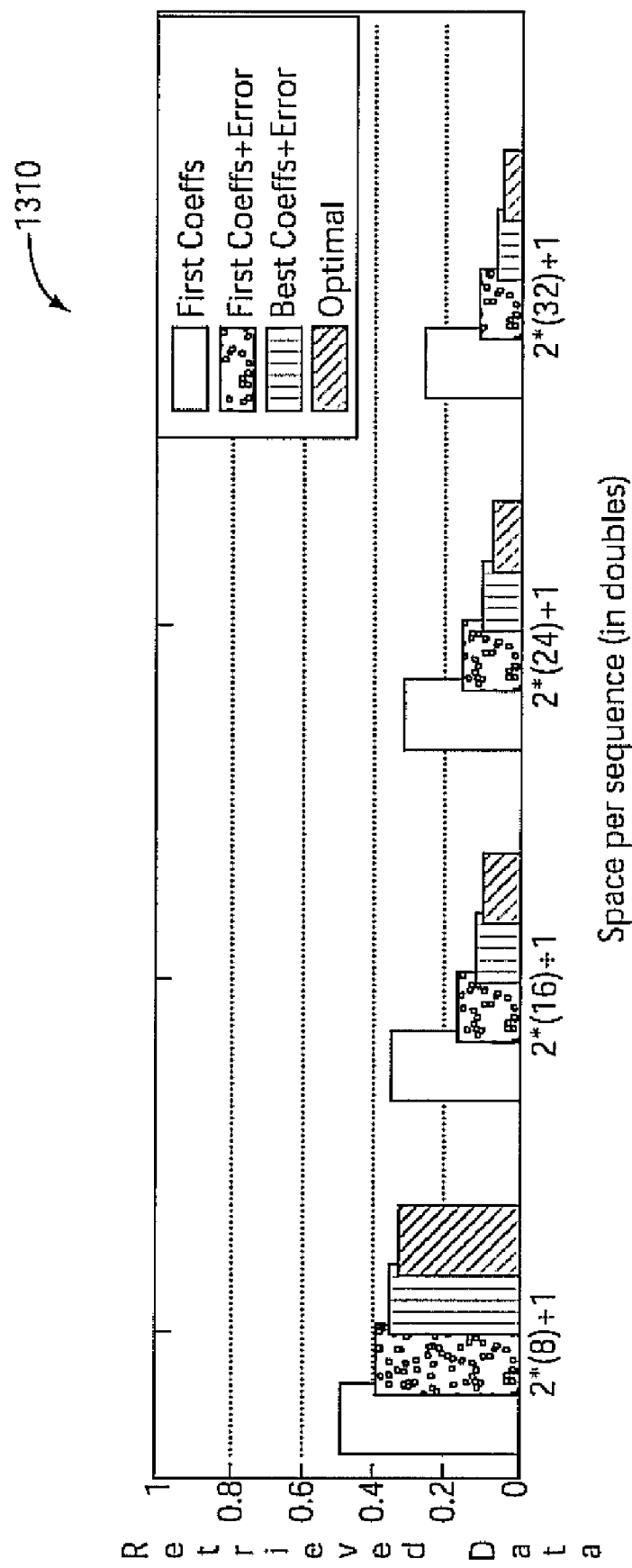
FIG. 13A is a plot of space per sequence (in doubles) versus retrieved data, for a plurality of optimization approaches.
Figure 13B:
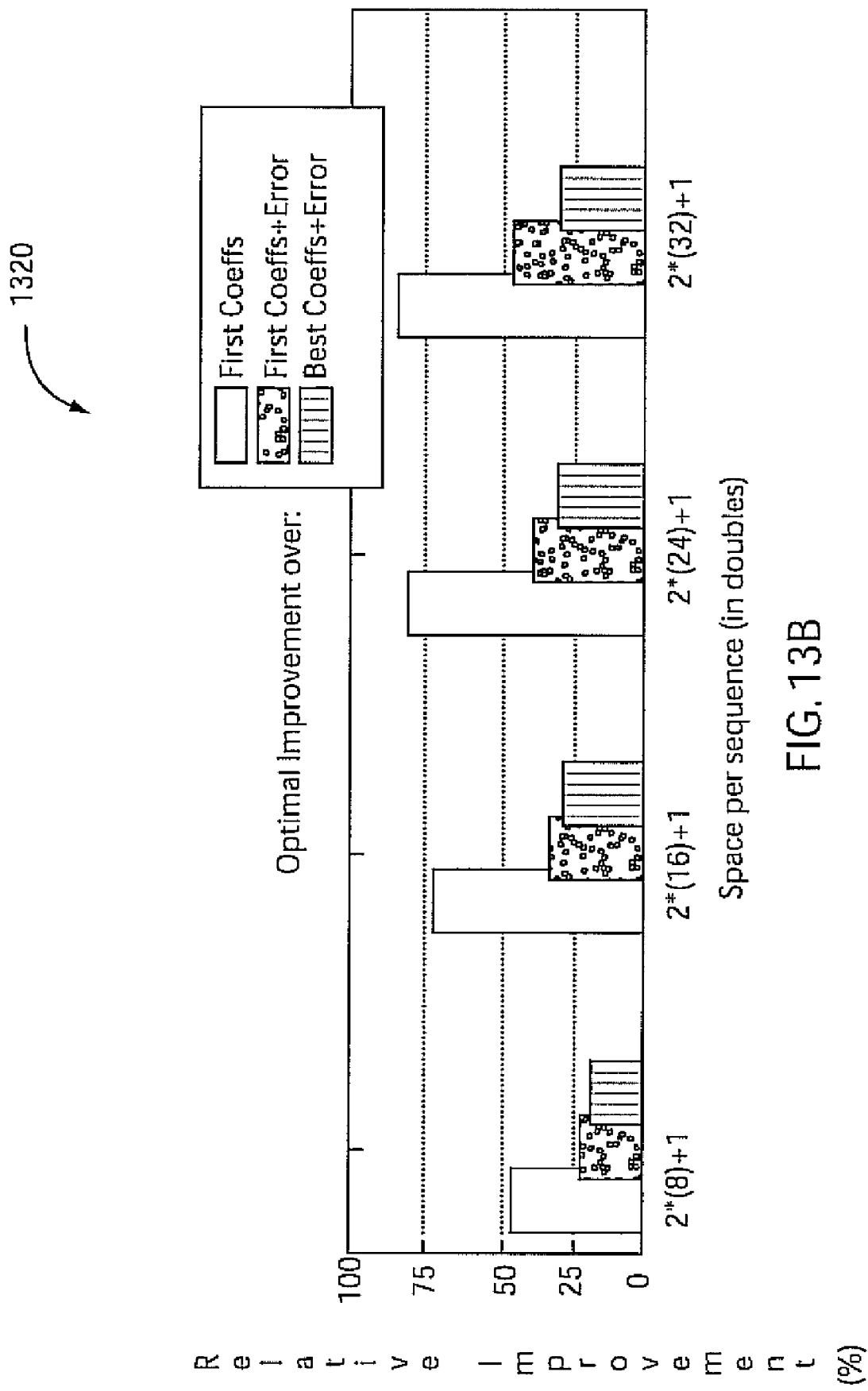
FIG. 13B is a plot of space per sequence (in doubles) versus relative improvement (in percent) for a plurality of optimization approaches.

We evaluate the performance of each technique based on the search procedure presented herein above, which prunes the search space and directs the search based on the lower/upper bounds derived from the compressed sequences. Ultimately, we measure the amount of uncompressed sequences that each technique retrieves from disk. This essentially reflects the most important bottleneck of a search performance, since it is an I/O bound process. FIG. 13A is a plot of space per sequence (in doubles) versus retrieved data, for a plurality of optimization approaches. In particular, FIG. 13A shows how many uncompressed sequences 1310 were retrieved for each search approach, normalized by the total number of sequences. In FIG. 13A, lower numbers are preferred. FIG. 13B is a plot of space per sequence (in doubles) versus relative improvement (in percent) for a plurality of optimization approaches. That is, FIG. 13B shows the relative improvement 1320 achieved by the optimal algorithm. In FIG. 13B, higher numbers are preferred. When using [2* (32)+1] doubles per sequence we observe the largest improvement in performance. For example, improvements of 80%, 50%, 30% compared to the 3 other distance bounding methodologies. Therefore, we can achieve excellent performance compared to previous state-of-the-art when utilizing the optimal distance bounds.

Thus, with these experiments we have seen that the presented optimal distance estimation algorithm converges fast, provides the tightest possible distance bounds, and can provide significant benefits in the search performance.

Accordingly, optimal distance estimation means tighter bounds, leading to better candidate selection/elimination and ultimately faster search performance. Our derivation of the optimal distance bounds is based on the careful analysis of the problem using optimization principles. The experimental evaluation suggests a clear performance advantage of the proposed method, compared to previous compression/search techniques. The presented method results in a 10-30% improvement on distance estimations, which in turn leads to 25-80% improvement on the search performance, as described above.

Here we provide a formal proof regarding the solution of the optimization problem that we are considering. Additionally, we show that the proposed algorithm fulfills all the requirements of the optimization solution and hence is guaranteed to be optimal.

For this presentation: Q is the full query vector of complex coefficients with dimensions n×1; X is the node vector of complex coefficients with dimensions n×1. For X, we assume that we only know n−m coefficients with the largest amplitudes and the remaining m coefficients are missing. Only n−m coefficients with the largest amplitudes are stored in the node. Suppose $X^-$ is the complex vector of missing components, and $Q^-$ is the corresponding complex vector for the query with matching entries to $X^-$. Here, $Q^-$ is known, and $X^-$ is unknown. However, by construction, we know that $\|X_k^-\| \leq X_{min}$ for each k=1, ..., m, where $X_{min}$ is the smallest amplitude among the stored coefficients of $X^+$ and $\|X^-\|=e_x$.

We solve the following constraint optimization problems:

$$\max_{X^-} \|X^- - Q^-\|^2 \quad (9)$$

such that $$\|X^-\| = e_X \quad (10)$$

$$\|X_k^-\| \leq X_{\min}, k = 1, \ldots, m \quad (11)$$

and $$\min_{X^-} \|X^- - Q^-\|^2 \quad (12)$$

such that $$\|X^-\| = e_X \quad (13)$$

$$\|X_k^-\| \leq X_{\min}, k = 1, \ldots, m \quad (14)$$

Since $\|X^- - Q^-\|^2 = \|X^-\|^2 - 2X^- \cdot Q^- + \|Q^-\|^2$ (where $X^- \cdot Q^-$ is the inner product of two complex vectors) and $Q^-$ is known, and using the constraint in Equation (10) (or in Equation (13)), we maximize (or minimize) only the middle term in the following $$\|X^- - Q^-\|^2 = e_x^2 - 2X^- \cdot Q^- + \|Q^-\|^2,$$

i.e., the inner product term, $X^- \cdot Q^-$. We will only solve the maximization problem, since the vector $X^{-'*}$ which is the maximizer of Equation (9), i.e., the minimizer of $X^- \cdot Q^-$, can be replaced by $-X^{-'*}$ to get the minimizer solution for Equation (12) (while satisfying all the constraints). We next define the following $$r_k = \|X_k^-\|, k=1, \ldots, m$$

$$s_k = \|Q_k^-\|, k=1, \ldots, m$$

as the amplitudes and $\theta_k$, k=1, ..., m as the corresponding angles between $X_k^-$ and $Q_k^-$. We note that the angle $\theta_k$'s is the phase angle of $X_k^- - Q_k^-$. By this change of variables, the maximization can be written as follows $$\max_{r_1, \ldots, r_m, \theta_1, \ldots, \theta_m} e_X^2 - \sum_{k=1}^{m} r_k s_k \cos(\theta_k) + \|Q^-\|^2 \quad (15)$$

such that $$\sum_{k=1}^{m} r_k^2 = e_X^2$$

$$0 \leq r_k \leq r, k = 1, \ldots, m.$$

Since in Equation (15), $\theta_i$, k=1, ..., m are unconstrained and can be chosen independently from the other variables, yields the following $$\max_{r_1, \ldots, r_m} e_X^2 + \sum_{k=1}^{m} r_k s_k + \|Q^-\|^2 \quad (16)$$

such that $$\sum_{k=1}^{m} r_k^2 = e_X^2$$

$$0 \leq r_k \leq r, k = 1, \ldots, m.$$

by selecting each $\theta_i = \pi$, $\cos(\pi) = -1$, to give the maximum difference. To solve this re-parameterized minimization problem, we form the corresponding Lagrangian $$L(\lambda, \beta_1, \ldots \beta_m) = \left( e_X^2 + \sum_{k=1}^{m} r_k s_k + \|Q^-\|^2 \right) + \lambda \left( e_X^2 - \sum_{k=1}^{m} r_k^2 \right) + \sum_{k=1}^{m} \beta_k (r - r_k),$$

where $\beta_k \geq 0$, k=1, ..., m. Taking the derivatives of the Lagrangian with respect to unknown variables $\lambda, \beta_k, r_k$, yields the following Kuhn-Tucker conditions, for k=1, ..., m.

$$s_k - 2\lambda r_k - \beta_k = 0 \quad (17)$$

$$\beta_k (r - r_k) = 0 \quad (18)$$

-continued $$\sum_{k=1}^{m} r_k^2 = e_X^2 \qquad (19)$$

where $\beta_k \geq 0$, $k=1, \ldots, m$. Observe that Equation (17) can also be written as $$r_k = \frac{s_k - \beta_k}{2\lambda}, k = 1, \ldots, m, \text{ i.e.,}$$

each $r_k$ is directly proportional to $s_k$ except a bias term $\beta_k$.

Therefore, the unknown vector $X^-$ needs to be a rescaled version of the known vector $Q^-$, which directly corresponds to the solution provided by our main algorithm. Hence, the proposed solution satisfies the necessary Kuhn-Tucker conditions, and yields the desired optimal minimizer/maximizer solution.

It is to be appreciated that the techniques are of independent interest for any time-series search application. The various components of the presented technique are also quite generic, both on the compression scheme that can be used and on the utilized distance function. The compressed sequence can use any orthonormal data transformation (Fourier, wavelet, principal component) without any change in the presented method. Additionally, even though the presentation uses the Euclidean distance for comparing the compressed sequences, as mentioned above, most any linear distance function could also be utilized. Additionally, as mentioned above, even non-linear functions, such as the Dynamic Time Warping or the Longest-Common-Subsequence, can be effectively bounded by linear functions and, thus, the technique can be applicable for non-linear distance functions as well. The presented techniques can also be combined with index structures (e.g. metric trees) for achieving an additional performance boost in the search performance.

It is to be further appreciated that herein we use the term "time-series" loosely, in order to indicate sequence data. Sequence data, as used herein, may refer to a vector (or other representation) of numerical values, where the numerical values may be of any dimension, including any of, low dimensional values (e.g., 1-dimensional values) up to any higher dimensional values. For example, the numerical vector describing the shape or perimeter of an object can be considered as a two-dimensional sequence. Notice, that in this case there is no "time'" involved, but still we can treat the object as a two-dimensional "time-series" because each point in the sequence is not completely independent from its previous or next point in the sequence. In a similar fashion, an image can also be converted into sequence data, for example, by extracting and concatenating the color histograms of the image. The techniques presented here are applicable for any application utilizing time-series data. Let us consider for example some applications where the proposed technique can be applicable, although this description is merely illustrative and is, thus, not to be considered limiting as far as applicability of the present principles are concerned:

(1) Medical applications: Given a database of compressed medical measurements, such as ECG data, and given a patient ECG, find which ECG in the database is most similar to the given ECG.

(2) Multimedia and rights protection: Given a database of compressed songs (time-series data) and another given (compressed or compressed) query song, find if the query is similar to any of the songs in the database.

(3) Search on internet web logs: Suppose that we have a database of time-series each one describing the popularity/demand for all keywords posed at a search engine. Given a certain keyword, and its (daily) demand in a time-series form, find the keywords that have similar demand patterns. This application/scenario is very useful for web search engines (GOOGLE, MSN, YAHOO!), because it can be used for search engine optimization, better keyword recommendation for advertisements, etc.

As we see, the problem that we are tackling is quite generic and can have a multitude of applications. We will describe our invention using the third application (search on compressed web log data) as our vehicle, but the exposed techniques are applicable for any class of similar problems, as well as other problems readily contemplated by one of ordinary skill in this and related arts.

Thus, we have presented a technique for computing the tightest possible distance bounds on compressed time-series/sequence data. The idea results in a significant speedup in similarity search operations. Such operations are fundamental in machine-learning, database and data-mining tasks, and therefore we expect this method to have a broad impact and applicability.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for similarity search, comprising:
   transforming sequence data into a compressed sequence represented by top-k coefficients of the sequence data and a sum of the energy of omitted coefficients of the sequence data; and
   computing at least one of a lower bound and an upper bound on a distance range between a query sequence and the compressed sequence, given a first and a second constraint, the first constraint being a sum of squares of the omitted coefficients being less than a sum of the energy of the omitted coefficients, the second constraint being the energy of the omitted coefficients being less than the energy of a lowest energy one of the top-k coefficients,
   wherein any of the lower bound and the upper bound is substantially identical to an actual distance between the query sequence and the compressed sequence subject to an amount of compression of at least the compressed sequence.

2. The method of claim 1, wherein the query sequence is compressed.

3. The method of claim 2, wherein any of the lower bound and the upper bound is substantially identical to the actual distance between the query sequence and the compressed sequence subject to the amount of compression of the query sequence and the compressed sequence.

4. The method of claim 1, wherein said computing step uses a linear distance function, and is unrestricted with respect to the linear distance function used.

5. The method of claim 1, wherein the linear distance function is Euclidean distance.

6. The method of claim 1, wherein said computing step uses a non-linear distance function that is capable of being bounded by a linear distance.

7. The method of claim 1, wherein the non-linear distance function is at least one of as Time-Warping and Longest Common Subsequence.

8. The method of claim 1, wherein the sequence data is transformed using an orthonormal transform.

9. The method of claim 8, wherein the orthonormal transform involves at least one of Fourier components, wavelet components, and principal components of the sequence data.

10. A computer readable storage medium comprising a computer readable program for similarity search, wherein the computer readable program when executed on a computer causes the computer to perform the steps of:

transforming sequence data into a compressed sequence represented by top-k coefficients of the sequence data and a sum of the energy of omitted coefficients of the sequence data; and computing at least one of a lower bound and an upper bound on a distance range between a query sequence and the compressed sequence, given a first and a second constraint, the first constraint being a sum of squares of the omitted coefficients being less than a sum of the energy of the omitted coefficients, the second constraint being the energy of the omitted coefficients being less than the energy of a lowest energy one of the top-k coefficients, wherein any of the lower bound and the upper bound is substantially identical to an actual distance between the query sequence and the compressed sequence subject to an amount of compression of at least the compressed sequence.

11. The computer readable storage medium of claim 10, wherein the query sequence is compressed.

12. The computer readable storage medium of claim 11, wherein any of the lower bound and the upper bound is substantially identical to the actual distance between the query sequence and the compressed sequence subject to the amount of compression of the query sequence and the compressed sequence.

13. The computer readable storage medium of claim 10, wherein said computing step uses a linear distance function, and is unrestricted with respect to the linear distance function used.

14. The computer readable storage medium of claim 10, wherein the linear distance function is Euclidean distance.

15. The computer readable storage medium of claim 10, wherein said computing step uses a non-linear distance function that is capable of being bounded by a linear distance.

16. The computer readable storage medium of claim 10, wherein the non-linear distance function is at least one of as Time-Warping and Longest Common Subsequence.

17. The computer readable storage medium of claim 10, wherein the sequence data is transformed using an orthonormal transform.

18. The computer readable storage medium of claim 17, wherein the orthonormal transform involves at least one of Fourier components, wavelet components, and principal components of the sequence data.

* * * * *